(12) United States Patent
Kono et al.

(10) Patent No.: US 7,555,045 B2
(45) Date of Patent: Jun. 30, 2009

(54) MPEG VIDEO DECODER AND MPEG VIDEO DECODING METHOD

(75) Inventors: Tadayoshi Kono, Kanagawa (JP); Mitsuhiko Ota, Kanagawa (JP); Hirohiko Inagaki, Kanagawa (JP)

(73) Assignee: Fujitsu Microelectronics Limited, Tokyo (JP)

( * ) Notice: Subject to any disclaimer, the term of this patent is extended or adjusted under 35 U.S.C. 154(b) by 914 days.

(21) Appl. No.: 10/614,054

(22) Filed: Jul. 8, 2003

(65) Prior Publication Data
US 2004/0008788 A1 Jan. 15, 2004

Related U.S. Application Data

(62) Division of application No. 09/372,039, filed on Aug. 11, 1999, now Pat. No. 6,628,719.

(30) Foreign Application Priority Data

Dec. 10, 1998 (JP) .................. 10-350893
Mar. 19, 1999 (JP) .................. 11-076530

(51) Int. Cl.
*H04N 7/12* (2006.01)
*H04N 5/91* (2006.01)

(52) U.S. Cl. .................. 375/240.25; 386/68

(58) Field of Classification Search ........... 375/240.25, 375/240.01, 240.28; 386/68, 91; 709/202
See application file for complete search history.

(56) References Cited

U.S. PATENT DOCUMENTS

| | | | |
|---|---|---|---|
| 5,038,209 A | 8/1991 | Hang | |
| 5,363,138 A | 11/1994 | Hayashi et al. | |
| 5,602,956 A * | 2/1997 | Suzuki et al. | 386/68 |
| 5,668,599 A | 9/1997 | Cheney | |
| 5,710,598 A | 1/1998 | Ukai et al. | |
| 5,719,646 A | 2/1998 | Kikuchi | |
| 6,085,221 A * | 7/2000 | Graf | 709/202 |
| 6,141,385 A | 10/2000 | Yamaji | |
| 6,263,023 B1 | 7/2001 | Ngai | |
| 6,320,909 B1 * | 11/2001 | Takabatake et al. | 375/240.25 |
| 6,654,539 B1 * | 11/2003 | Duruoz et al. | 386/68 |

FOREIGN PATENT DOCUMENTS

EP 0626770 5/1994

(Continued)

OTHER PUBLICATIONS

Office Action for corresponding Korean Application No. 10-1999-0038665 dated Aug. 10, 2005.

(Continued)

*Primary Examiner*—Gims S Philippe
(74) *Attorney, Agent, or Firm*—Staas & Halsey LLP

(57) ABSTRACT

A picture decoding section starts to decode a bit-stream for one picture when a decoding start command is supplied from a decoding start command generating section, and outputs a decoding completion command when the decoding is completed. Decoded picture data is stored in a decoding frame buffer. The decoding frame buffer outputs a bufferfull notification when a certain quantity of picture data is stored. The decoding start command generating section outputs the decoding start command to the picture decoding section when a decoding completion command is outputted from the picture decoding section and the bufferfull notification is not outputted from the decoding frame buffer.

11 Claims, 23 Drawing Sheets

FOREIGN PATENT DOCUMENTS

| | | |
|---|---|---|
| EP | 0817501 | 7/1998 |
| GB | 2 316 824 A | 3/1998 |
| JP | 5-122538 | 5/1993 |
| JP | 8-98176 | 4/1996 |
| JP | 8-125885 | 5/1996 |
| JP | 09009258 | 1/1997 |
| JP | 9-93577 | 4/1997 |
| JP | 10-93917 | 4/1998 |
| KR | 1998-016035 | 5/1998 |
| WO | WO98/42139 | 9/1998 |

OTHER PUBLICATIONS

European Search Report issued for Application No. 99306439.3-2223 on Feb. 8, 2006.

Cover page of Office Action dated Mar. 4, 2008 and issued in corresponding Japanese Patent Application.

Japanese Office Action issued on Mar. 3, 2009 in corresponding Japanese Patent Application 11-76530.

* cited by examiner

FIG. 4
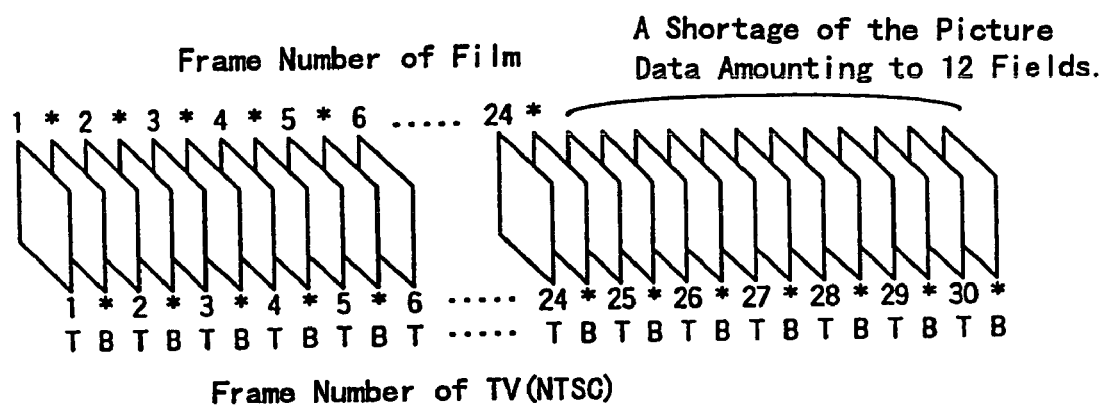
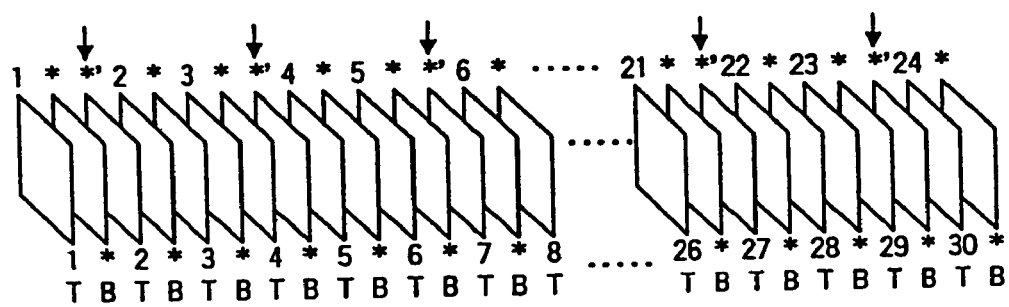

FIG. 19

| Parameters | | Number of the Display Fields |
|---|---|---|
| Repeat First Field Flag | 1/2 Slow Play Back Command Flag | |
| 0 | 0 | 2 |
| 0 | 1 | 4 |
| 1 | 0 | 3 |
| 1 | 1 | 6 |

FIG. 23

| Parameters | | | | | Number of the Display Fields |
|---|---|---|---|---|---|
| Repeat First Field Flag | Slow Play Back Flag | | | | |
| | 1/2 | 1/3 | 1/4 | 1/8 | |
| 0 | 0 | 0 | 0 | 0 | 2 |
| 0 | 1 | 0 | 0 | 0 | 4 |
| 0 | 0 | 1 | 0 | 0 | 6 |
| 0 | 0 | 0 | 1 | 0 | 8 |
| 0 | 0 | 0 | 0 | 1 | 16 |
| 1 | 0 | 0 | 0 | 0 | 3 |
| 1 | 1 | 0 | 0 | 0 | 6 |
| 1 | 0 | 1 | 0 | 0 | 9 |
| 1 | 0 | 0 | 1 | 0 | 12 |
| 1 | 0 | 0 | 0 | 1 | 24 |

MPEG VIDEO DECODER AND MPEG VIDEO DECODING METHOD

This application is a divisional of application Ser. No. 09/372,039, filed Aug. 11, 1999, now U.S. Pat. No. 6,628,719.

BACKGROUND OF THE INVENTION

The present invention relates to an MPEG video decoder for decoding a bit-stream which has been encoded according to a Moving Picture Expert Group (hereinafter, referred to as an MPEG) standard, and an MPEG video decoding method.

The MPEG standard has been heretofore employed as an international standard for a bit rate reduction of picture data. A moving picture encoding technology and a moving picture decoding technology, which are in conformity with the MPEG standard, are inevitable for recent multi-media environments. Many moving picture encoding apparatus and moving picture decoding apparatus which adopt the MPEG standard have been developed.

A bit rate reduction encoding by the MPEG standard includes a constant bit rate encoding (hereinafter, referred to as a CBR encoding) in which a data rate after encoding is substantially constant and a variable bit rate encoding (hereinafter, referred to as a VBR encoding) in which the data rate after encoding is not constant.

The CBR encoding is used when a transmission line is, in a STM mode (Synchronous Transfer Mode). The VBR encoding is used when the transmission line in an ATM mode (Asynchronous Transfer Mode), as well as when the transmission line is storage media such as a DVD (Digital Video Disc).

Descriptions for a picture type, a bit-stream, a MPEG video encoder and a MPEG video decoder, which are used in the MPEG standard, will be made below.

(1) Picture Type

In the MPEG standard, used are three types of pictures for a high efficiency encoding, which are called an intra coded picture (hereinafter, referred to as an I picture), a predictive coded picture (hereinafter, referred to as a P picture) and a bi-directional predictive coded picture (hereinafter, referred to as a B picture), respectively.

The I picture does not use information relating to other pictures, and encoded by only information relating to itself. The P picture is encoded by using the I picture or the P picture in the past as a reference picture. The B picture is encoded using the I picture or the P picture in the past and future.

Although the I picture exhibits a low compression rate, the I picture can be encoded independently from other pictures, so that the I picture is utilized as an access point in random accessing. For decoding the I picture, information relating to other pictures is unnecessary. Although the P picture exhibits a compression rate higher than that of the I picture, the P picture requires information relating to the I picture in the past for its decoding. Moreover, although the B picture exhibits the highest compression rate in all of the pictures, the B picture needs the information relating to the I or P picture for its decoding.

(2) Bit-Stream

FIG. 1 is a schematic view showing a structure of the bit-stream adopting the MPEG standard. The bit-stream consists of a sequence header 31, a GOP header (a group of picture header) 32, a picture header 33, picture data 34 and a sequence end code 35. The bit-stream includes a sequence extension and extension and user data in addition to these components. Illustrations and descriptions for them are omitted here.

The sequence header 31 always exists at the initial portion of the bit-stream. In the sequence header 31, included are a horizontal size value, a vertical size value and a parameter showing an aspect ratio information.

The GOP header 32 is added to the bit-stream when many pictures are managed for each GOP. The GOP consists of a plural types of pictures, and the first picture of the GOP is always the I picture. The GOP is inevitable in a MPEG 1 (Moving Picture Experts Group Phase 1), and optional in a MPEG 2 (Moving Picture Experts Group Phase 2).

The picture head 33 indicates the beginning of decoded data for one picture. A parameter (a temporal reference) indicating the order of the pictures and a picture type are included in the picture head 33.

The picture data 34 is encoded one for one picture. The picture data 34 is followed by the GOP header 32, the subsequent picture head 33 or the sequence end code 35. The sequence end code 35 indicates the end of the bit-stream.

(3) Structure of MPEG Video Encoder

FIG. 2 is a block diagram showing a MPEG video encoder.

The MPEG video encoder consists of a picture rearrangement section 41, a motion estimation section 42, an adder 43, a discrete cosine transform (hereinafter, referred to as a DCT) section 44, a quantization section 45, a variable length code section 46, a multiplexer section 47, a buffer 48, an inverse quantization section 49, an inverse discrete cosine transform (hereinafter, referred to as an IDCT) section 50, an adder 51, a picture storage section 52 and a motion prediction section 53.

Since the B picture decoded by referring to the pictures in the past and future exists in the MPEG, it is necessary to process the picture in the future prior to the picture in the past. The picture rearrangement section 41 rearranges the pictures in the processing order.

The motion estimation section 42 receives the picture from the picture rearrangement section 41, and outputs various kinds of parameters required in decoding, such as a picture type, a presentation time stamp (PTS), a quantization step size, a motion vector and an encoded mode. These parameters are supplied to the motion prediction section 53, and added also to the bit-stream in the multiplexer section 47.

The adder 43 calculates the differential between the picture outputted from the motion estimation section 42 and the reference picture outputted from the motion prediction section 53. Since the reference picture is not outputted from the motion prediction section 53 at the time when the I picture is processed, the picture outputted from the motion estimation section 42 is inputted to the DCT section 44 via the adder 43. Moreover, when either the P picture or the B picture is processed, the adder 43 calculates the differential between the picture outputted from the motion estimation section 42 and the reference picture outputted from the motion prediction section 53, and outputs the differential to the DCT section 44.

The DCT section 44 performs a discrete cosine transform for the data supplied from the adder 43, divides the data into each of frequency components, and removes high frequency components, thus reducing the quantity of the data. The quantization section 45 removes information with less importance by the quantization that is a non-reversible step. The variable length code section 46 zigzag-scans the quantized data so as to perform a variable encoding for the quantized data, thus further reducing the quantity of data.

On the other hand, the inverse qunatization section 49 and the IDCT section 50 performs an inverse discrete cosine transform and an inverse quantization for the data that has been subjected to the discrete cosine transform by the DCT section 44 and the quantization by the quantization section 45. The adder 51 adds the data outputted from the IDCT section to the reference picture outputted from the motion prediction section 53 so as to restore the picture, thus storing the restored picture in the picture storing section 52. The motion prediction section 53 performs a motion prediction based on the motion vector outputted from the motion estimation section 42, the output from the adder 51, and the picture stored in the picture storing section 52. Furthermore, the motion prediction section 53 creates a reference picture from either the output of the adder 51 or the picture stored in the picture storing section 52, and outputs the reference picture to the adder 43.

The multiplexer section 47 multiplexes the data outputted from the variable length code section 46 and the parameters such as the encoded mode and the motion vector outputted from the motion estimation section 42, thus creating the bit-stream. The buffer 48 temporarily stores the bit-stream created.

(4) Structure of MPEG Video Decoder (No. 1)

FIG. 3 exemplifies a block diagram of a MPEG video decoder.

The MPEG video decoder shown in FIG. 3 consists of a bit-stream input terminal 60, a bit-stream buffer 61, a picture decoding section 62, a decoding frame buffer 63, a decoding switch 64 and a picture data output section 65. Furthermore, the picture data output section 65 consists of a display control section 65*a*, a display switch 65*b* and a display buffer 65*c*.

The bit-stream buffer 61 stores the bit-stream inputted from the input terminal 60, and sequentially outputs the bit-stream to the picture decoding section 62. Upon receipt of the vertical synchronous signal V-Sync 71 from the display control section 65*a*, the decoding switch 64 outputs the decoding start command 72 to the picture decoding section 62. Upon receipt of the decoding start command 72 from the decoding switch 64, the picture decoding section 62 receives the bit-stream for one picture from the bit-stream buffer 61, so as to perform a variable length decoding processing, an inverse quantization processing, an inverse discrete cosine transform processing and a motion prediction. The picture decoded by the picture decoding section 62 in the above described manner is sequentially stored in the decoding frame buffer 63. It should be noted that when the picture decoding section 62 decodes the bit-stream, the picture decoding section 62 refers to the picture previously stored in the decoding frame buffer 63 according to demand. Accordingly, the decoding frame buffer 63 has to keep the decoded picture stored therein until the decoded picture is not referred to for decoding other pictures. Moreover, when the bit-stream is decoded, the picture decoding section 62 extracts the display time stamp (PTS) 76 from the bit-stream, thus outputting the PTS 76 to the picture data output section 65.

The display control section 65*a* compares its system time clock (STC) with the display time stamp PTS 76 of the decoded picture, and if both are coincident with each other, the display control section 65*a* outputs the transfer command 73 to the display switch 65*b*. Upon receipt of the transfer command 73, the display switch 65*b* transfers data for one picture (picture data) from the decoding frame buffer 63 to the display buffer 65*c*. The picture data stored in the display buffer 65*c* is transmitted to the display unit 66 from the display control section 65*a* in synchronization with the vertical synchronous signal V-Sync 71.

In the above described manner, the conventional MPEG video decoder, the bit-stream reads out one picture by one picture from the bit-stream buffer 61 at a timing synchronous with the vertical synchronous signal V-Sync 71, and performs a decoding processing for the read-out bit-stream. At the same time, the conventional MPEG video decoder transmits the picture from the display buffer 65*c* to the display unit 66 at the timing in synchronization with the vertical synchronous signal V-Sync 71. Thus, the picture displayed on the display unit 66 is updated at the timing in synchronization with the vertical synchronous signal V-Sync 71, and the moving picture is displayed on the display unit 66.

Hereupon, it is required for the MPEG video decoder to decode the bit-stream in real time, in order to obtain a smooth reproduced moving picture. To satisfy this requirement, the MPEG video decoder has to possess an ability to completely decode the bit-stream for one picture within one frame time (a reciprocal of the number of frames per second) and to output data for one picture per one frame time to the display unit. The conventional MPEG video decoder shall terminates the decoding of the bit-stream for one picture within one frame time. The timing when the MPEG video decoder starts to decode the bit-stream for one picture and the timing when the MPEG video decoder outputs data for one picture to the display unit therefrom are made to be synchronous with the vertical synchronous signal V-Sync.

(Other Prior Arts)

In the MPEG, when a video with a frame rate of 24 frames/sec in a moving picture is converted to a video for use in TVs with a frame rate of 30 frames/sec, i.e., a telecine conversion, conversion processes called a 3-2 pull down are performed. In the 3-2 pull down, a command called a repeat first field is used. The repeat first field command is the one indicating "Display the initially displayed field once more".

FIG. 4 is a figure schematically showing the telecine conversion by the 3-2 pull down. In FIG. 4, the symbol * represents the repetition of the image, similarly. The symbol *' represents the repetition of the same image by the repeat first field.

One frame of a television video displayed by a NTSC (National Television System Committee) scheme is divided into two fields, i.e., a top field and a bottom field. Accordingly, a TV video for one second consists of am image for 60 fields.

As shown in FIG. 4, in the case where the video of the moving picture is converted to the TV video, one picture is allocated to the top field (T) and bottom field (B) of each frame, whereby the picture data for 24 frames is created. However, if the picture data for 24 frames is displayed as it is, a shortage of the picture data amounting to 6 frames (12 fields) is brought about. To cope with such situation, in the telecine conversion, the repeat first field command is added to 12 frames among 24 frames, and the picture data for 12 fields is created. To be specific, by adding the repeat first field command to, for example, an odd-numbered frame, the picture of the odd-numbered frame will be displayed three times. In other words, the picture for three fields will be displayed. In FIG. 4, the arrow (↓) represents a picture displayed repeatedly by the repeat first field command. As described above, the 3-2 pull down has a function capable of converting the video with 24 frames/second into the video with 30 frames/second.

(5) Structure of MPEG Video Decoder (No. 2)

FIG. 5 is a block diagram exemplifying a MPEG video decoder to cope with the 3-2 pull down. This MPEG video decoder consists of a bit-stream input terminal 160, a bit-stream buffer 161, a picture decoding section 162, a decoding frame buffer 163, a decoding control section 164 and a display control section 165.

The bit-stream buffer 161 stores a bit-stream inputted from the input terminal 160, and outputs the bit-stream sequentially one picture by one picture to the picture decoding section 162. The picture decoding section 162 decodes the bit-stream sent from the bit-stream buffer 161. The picture decoded by the picture decoding section 162 is transferred to the decoding frame buffer 163.

The decoding frame buffer 163 has a memory area for, for example, three pictures, and the memory area is partitioned for each picture. Each of the memory area partitioned for one picture is called a bank. Each of the respective banks has a specific address, i.e., a bank address.

The decoding control section 164 incorporates a V-Sync generator (not shown) for generating a vertical synchronous signal (hereinafter, referred to as a V-Sync) therein. The decoding control section 164 issues a decoding start command 172 in synchronization with the V-Sync outputted from the V-Sync generator. The picture decoding section 162 starts to decode the picture in response to the decoding start command 172. The decoding start command 172 is principally issued once for two field time, that is, once for one frame time. This is because, since the displaying speed is set to a value equivalent to a time for displaying one picture within one frame, the decoding speed must be made to be equal to the displaying speed.

When a certain quantity of the bit-stream is stored in the bit-stream buffer 161 after turning on the power source, i.e., after a cold start, the decoding control section 164 issues an initial decoding start command 171. The timing when the initial decoding start command 171 has no relation to the V-Sync.

The display control section 165 has four registers of a re-order register 165a, a current register 165b, a field delay register 165c and a display register 165c. In addition, the decoding start command 172, the V-Sync 175 and the bank address 176 are inputted from the decoding control section 164 to the display control section 165, and various kinds of parameters 173 such as a sequence parameter and a picture parameter which were obtained by decoding the bit-stream are inputted to the display control section 165 from the picture decoding section 162. It should be noted that the bank address 176 is data indicating which bank of the decoding frame buffer 163 the decoded picture is stored. The display control section 165 outputs a field wait command 174 to the decoding control section 164 when later-described conditions are satisfied. The field wait command 174 is the one for allowing the display control section 165 to wait the issue of the decoding start command 172 for a period of one frame.

Furthermore, the display control section 165 issues a display starting command 178 after later described conditions are satisfied. The display starting command 178 issued from the display control section 165 permits a specified picture to be transferred to the display unit from the decoding frame buffer 163, and a picture is displayed on the display unit.

The four registers 165a to 165d of the display control section 165 will be described with reference to the schematic view of FIG. 6 below.

① Re-Order Register 165a

The re-order register 165a stores the parameter of the I and P pictures and the bank address thereof. The I and P pictures are not displayed immediately after completion of decoding them, a rearrangement for replacing the I and P pictures with the B picture (re-ordering) must be executed. In order to execute the rearrangement, the parameter and bank address of the I and P pictures are once shunted to the re-order register 165a.

② Current Register 165b

The current register 165b stores the parameter and bank address of the picture to be displayed. Since the B picture is displayed immediately after completion of decoding the B picture, the parameter and bank address of the B picture are not stored in the re-order register 165a, but stored in the current register 165b.

The display control section 165 analyzes the parameter stored in the current register 165b, and if a repeat first field flag is "1", the display control section 16 issues the field wait command 174 to the decoding control section 164.

③ Field Delay Register 165c

In order to make the decoding time equal to one frame time The field delay register 165c allows the bank address transferred from the current register 165c to be delayed by a period for one field, and then transfers the bank address to the display register 165d in the subsequent stage. If the field delay register 165c were not present, a field slot at the display timing becomes identical to the field slot immediately after the field slot at the decoding timing, resulting in a displaying at an incorrect timing. Data stored in the field delay register 165c is only the bank address 176.

④ Display Register 165d

The display register 165d stores the bank address of the picture that is being displayed. In other words, the display control section 165 issues the display starting command so as to display the picture indicated by the bank address which is stored in the display register 165d. Data stored in the display register 165d is only the bank address 176.

As shown in FIG. 6, these four registers 165a to 165d form a shift register construction. Shift pulses from the re-order register 165a and the current register 165 are the decoding start command 172, and shift pulses from the filed delay register 165c and the display register 165d are the V-Sync 175. While the bank address 176 shifts from the re-order register 165a to the display register 165d thoroughly, the parameter 173 shifts merely from the re-order register 165a to the current register 165b.

Next, an operation of the above-described MPEG video decoder will be described with reference to the timing charts of FIGS. 7 and 8. It should be noted that in this example, the bit-stream shall be inputted in the order of the I picture I2, the B picture B0, the B picture B1, the P picture P5, the B picture B3, the B picture B4 . . . , and the bit-stream shall be displayed in the order of the picture B0, the picture B1, the picture I2, the picture B3, the picture B4, the picture P5, . . . Moreover, it should be also noted that the repeat first field command shall be added to the B pictures B0 and B4 and the I picture I2.

The MPEG bit-stream sent from the transmission path or the storage media is first stored in the bit-stream buffer 161. When a certain quantity of data, i.e., data for one picture, is stored in the bit-stream buffer 161, the decoding control section 164 issues the initial decoding start command 171. Upon receipt of the initial decoding start command 171, the picture decoding section 162 decodes only the picture header (I2) of the initial picture I2, and upon completion of decoding the picture header (I2), the picture decoding section 162 stops the decoding processing (time t0).

Thereafter, the decoding control section 164 issues the decoding start command 172 at the timing in synchronization with the V-Sync (time t1). Upon receipt of the decoding start command 172, the picture decoding section 162 start to decode the coefficient other than the picture header of the picture I2 (hereinafter, referred to simply as coefficient). When decoding for the coefficient of the picture I2 is completed, the picture decoding section 162 subsequently decodes the picture header (B0) of the subsequent picture B0. Upon completion of decoding the picture header (B0) of the picture B0, the picture decoding section 162 stops the decoding processing (time t2).

On the other hand, the display control section 165 receives the parameter of the picture I2 from the picture decoding section 164 at the time t1, and stores the parameter in the re-order register 165a thereof. At this time, re-order register 165a stores the parameter of the picture I2 at the timing in synchronization with the decoding start command 172, by the use of the decoding start command 172 as a latch pulse.

At the time t3, the decoding control section 164 issues the decoding start command 172 in synchronization with the V-Sync 175 again, so that decoding of the coefficient of the picture B0 is started by the picture decoding section 162. At the same time, the parameter 173 of the picture B0 is stored in the current register 165b.

When the parameter of the picture B0 is stored in the current register 165b at the time t3, the display control section 165 analyzes the parameter that has been stored in the current register 165b. As a result, since the repeat first field flag of the picture B0 is "1", the display control section 165 issues the field wait command 174 to the decoding control section 164 (time 3.5).

Upon receipt of the field wait command 174, the decoding control section 164 delays the issue of the decoding start command 172 for the picture B1, which was to be issued at the time t5, by a period for one field, and issues the decoding start command 172 at the time t6.

When the decoding control section 164 issues the decoding start command 172 for the picture B1 at the time t6, the decoding of the coefficient of the picture B1 is started in the picture decoding section 162, and, at the same time, the parameter of the picture B1 is stored in the current register 165b of the display control section 165. The display control section 165 analyzes the parameter that has been stored in the current register 165b. Since it is found from the analysis result that the repeat first field flag of the picture B1 is "0", the display control section 165 does not issue the field wait command 174.

Since the field wait command is not issued, the decoding control section 164 does not wait the issue of the decoding start command 172 for the subsequent picture P5 by a period of one field, and issues the decoding start command 172 at the time t7.

When the decoding start command 172 for the picture P5 is issued at the time t7, the parameter of the picture I2 that has been stored in the re-order register 165a up to the time t7 is shifted to the current register 165b, and the parameter of the picture P5 is stored in the reorder register 165a.

As a result of the analysis for the parameter stored in the current register 165b by the display control section 165, since the repeat first field flag of the picture I2 is "1", the display control section 165 issues the field wait command 174.

These operations are repeated from this point, in other words, if the repeat first field flag of the picture to be subsequently displayed is "1" as a result of the investigation for the current register 165b, the display control section 165 issues the field wait command 174, and the decoding control section 164 delays the issue of the decoding start command 172 for a period of one field. By repeating these sequential operations, the 3-2 pull down is realized. To be specific, the conventional MPEG video decoder executes the 3-2 pull down by successfully adopting a method to suspend the decoding for a period of one frame in response to the repeat first field command.

The inventor of this application thinks that the above-described MPEG video decoder involves the following problems. Specifically, if a data rate is substantially constant like a CBR coding, a time required for decoding the bit-stream for one picture will be substantially even, so that decoding the bit-stream for one picture within the one frame time is comparatively easy. However, in the case where a VBR coded bit-stream is decoded like in terminal devices of ATMs and DVD players, the data rate greatly varies, so that the bit-stream for one picture cannot be often decoded within one frame time. When the bit-stream for one picture cannot be decoded within one frame time, decoding of the bit-stream is completed by using a time for a subsequent one frame. Then, the picture data for one frame, which is to be outputted to the display unit, is thinned out, so as to control the play back time. An operation to control the play back time by thinning out the picture data as described above is called an error-concealment.

When the VBR coded bit-streams of the terminal devices of the ATMs, the DVD players and the like are decoded, a time more than one frame time is often taken for decoding the bit-stream for one picture because of variations of the data rate as described above, so that the error concealment must be frequently carried out, resulting in difficulty of a smooth moving picture play back.

Moreover, when the above-described conventional MPEG video decoder tries to realize the 3-2 pull down and slow play backs at a ½ time speed and a ¼ time speed simultaneously, a disadvantage occurs. This is because the conventional MPEG video decoder realizes the 3-2 pull down by a method to suspend the decoding for one frame time, and the slow play back is realized also by the same method. The foregoing disadvantage will be described in more detail with reference to the timing charts of FIGS. 9 and 10.

It is assumed that a ½ time speed display command (hereinafter, referred to as a ½ slow play back command) be issued at the time t2.2. In the conventional MPEG video decoder, the ½ slow play back command is inputted to the decoding control section 164. The decoding control section 164 samples the ½ slow play back command at the timing of the decoding start command 172 issued by the decoding control section 164 itself, so as to perform the decoding control (time t3). To be specific, the decoding control section 164 performs the decoding control in such manner that if the ½ slow play back command is "1" at the time when the decoding start command 172 is issued, the decoding of the subsequent picture is started after delaying by one frame time, and the picture for which the decoding has just started is displayed for two frame time.

Since one picture is displayed only for one frame time in the ordinary play back, the displaying of one picture for a period of two frame time implies that the video is displayed at a speed of one-half that of the ordinary play back.

In this example, the result. Obtained by sampling the ½ slow play back command at the time t3 is "1". Accordingly, after the decoding for the picture B0 is finished, the decoding for the subsequent picture B1 is delayed by one frame time, and the decoding for the picture B1 is begun at the time t6.5.

Hereupon, because the picture B0 exhibits the repeat first field flag of "1", the field wait command 174 is issued from the display control section 165 (time 3.5). Accordingly, the decoding control section 164 executes both "wait the decoding for one frame time (two field time)" in response to the ½ play back command and "wait the decoding for one field time" in response to the field wait command 174. In this case, since the wait time in the latter is shorter than that of the former, the latter is neglected (time t5 to t6). Namely, although the conventional MPEG video decoder is originally obliged to execute "3-2 pull down displaying and ½ slow play back", the conventional MPEG video decoder merely execute "½ slow play back".

As shown in FIGS. 9 and 10, when it is assumed that the ½ slow play back command be "1" from the time t2.2 to t6.7, though the picture B0 must be originally displayed for a period of the six frames, the picture B0 is displayed only for a period of two frames.

The object of the present invention is to provide a MPEG video decoder, in which the necessity of an error concealment hardly occurs even in the case of decoding a MPEG bit-stream that has been subjected to a VBR, enabling a smooth moving picture play back.

Another object of the present invention is to provide a MPEG video decoder which is capable of displaying a video by a 3-2 pull down as well as by a slow play back, and a method for decoding a MPEG video.

SUMMARY OF THE INVENTION

As shown in FIG. 11, a MPEG video decoder of the present invention comprises a picture decoding section 12 for starting a decoding of a MPEG bit-stream for predetermined pictures in response to a decoding start command 22 and outputting a decoding completion notification 23 upon completion of decoding the bit-stream for the foregoing predetermined pictures; a decoding frame buffer 13 for sequentially storing picture data decoded by the foregoing picture decoding section 12 and outputting a bufferfull notification 24 when a predetermined quantity of picture data is stored; a decoding start command generating section 14 for outputting-the foregoing decoding start command 22 if the foregoing decoding completion notification 23 is outputted from the foregoing picture decoding section 12 and the foregoing bufferfull notification 24 is not outputted from the foregoing frame buffer 13; and a picture data output section 15 for transmitting the picture data stored in the foregoing decoding frame buffer 13 to a display unit 16.

In the MPEG video decoder of the present invention, if the decoding completion notification 23 is outputted from the picture decoding section 12 and the bufferfull notification 24 is not outputted from the decoding frame buffer 13, the decoding start command generating section 14 outputs the decoding start command 22. Upon receipt of the decoding start command 22, the picture decoding section 12 starts to decode the bit-stream for the predetermined pictures. When the decoding of the bit-stream for one picture is completed, the picture decoding section 12 outputs the decoding completion notification 23. Upon receipt of the decoding completion notification 23, the decoding start command generating section 14 outputs the decoding start command 22 to the picture decoding section 12. In such manner described above, until a certain quantity of picture data is stored in the decoding frame buffer 13, the picture decoding section 12 decodes the picture data consecutively.

In the case where the VBR decoded bit-stream is decoded, a data rate is greatly varies, so that the decoding of the data for one picture is not often completed within one frame time. As in the conventional, in the case where a timing in starting the decoding of the bit-stream for one picture is made to be synchronous with a vertical synchronous signal V-Sync, and the decoding of the bit-stream for one picture is not completed within one frame time, an error concealment always occurs in a subsequent frame. However, in the present invention, if there are some allowance in the decoding frame buffer 13 as described above, the decoding of the bit-stream is consecutively performed. For this reason, even when the decoding of the bit-stream for one picture is not completed within one frame time, an occurrence of the error concealment can be avoided as long as the decoding of the bit-stream for two pictures is completed within two frame times. Thus, a smooth moving picture play back will be enabled.

In the MPEG video decoder of the present invention, an input terminal 10 for receiving the MPEG bit-stream and a bit-stream buffer 11 for temporarily storing the bit-stream may be provided in the pre-stage of the picture decoding section 12. In this case, it should be preferable that the decoding start command generating section 14 outputs a signal supplied from the outside, i.e., a host computer, the decoding completion notification 23 and the decoding start command 22 in response to the bufferfull notification 24. Thus, decoding starting conditions can be set from the outside. For example, the decoding starting condition can be set so that the decoding is not started until the picture data (bit-stream) for a predetermined number of sheets is stored in the bit-stream buffer 11.

The picture data output section 15 transmits the picture data stored in the decoding frame buffer 13 to the display unit 16 at a timing in synchronization with the vertical synchronous signal V-Sync 28. Upon receipt of the picture data, the display unit 16 displays an image. The picture data output section 15 consists of a display buffer 15c for temporarily storing the picture data to be transmitted to the display unit 16, and a display control section 15a for transferring the picture data from the decoding frame buffer 13 to the display buffer 15c. In this case, a pause (temporal stop) can be realized in a manner described below. Specifically, when a pause command 27 is inputted from the outside, i.e., a host computer, to the display control section 15a, the display control section 15a suspends to transfer the picture data from the decoding frame buffer 13 to the display buffer 15c. On the other hand, the picture decoding section 12 continues the decoding of the picture up to the point of time the bufferfull notification 24 is outputted from the decoding frame buffer 13. Then, with a storage of a certain quantity of the picture data in the decoding frame buffer 13, the frame bufferfull notification 24 is outputted from the decoding frame buffer 13, and then the decoding start command generating section 14 ceases to output the decoding start command 22. With no receipt of the decoding start command 22, the picture decoding section 12 suspends the decoding. Moreover, since picture data stored in the display buffer 15c is not updated, the same picture is displayed on the display unit 16.

Furthermore, in the MPEG video decoding method of the present invention, as shown in FIG. 11, respective MPEG bit-streams for the predetermined number of pictures are decoded, each of the decoded MPEG bit-stream is stored in the decoding frame buffer 13, and the picture data for one picture, which is stored in the foregoing decoding frame buffer 13, is sequentially transferred to the display unit 16. With a storage of a certain quantity of the picture data in the foregoing decoding frame buffer 13, the decoding of the bit-stream is suspended, and when the storage quantity of the picture data becomes less than the foregoing certain quantity of the picture data, the decoding of the bit-stream is restarted.

In the MPEG video decoding method of the present invention, since the decoding of the picture is consecutively performed until the certain quantity of the picture data is stored in the decoding frame buffer, an occurrence of the error concealment is suppressed, thus enabling a smooth moving picture play back.

As exemplified in FIG. 15, another MPEG video decoder of the present invention comprises a picture decoding section 112 for starting a decoding of a MPEG bit-stream in response to a decoding start command 122; a decoding frame buffer 113 for storing picture data decoded by the foregoing picture decoding section 112; a display control section 115 for analyzing parameters of the picture data for predetermined pictures, the picture data being decoded by the foregoing picture decoding section 112, and controlling a transfer of the foregoing picture data from the decoding frame buffer 113 to a display unit in response to an analysis result; and a decoding control section 114 for outputting the foregoing decoding start command 122 based on the parameters of the foregoing picture data.

In another MPEG video decoder of the present invention, the display control section 115 analyzes the parameters of the picture data, and controls the transfer of the picture data from the decoding frame buffer 113 to the display unit in response to the analysis result. For example, the display control section 115 determines the number of display fields for each picture based on the parameter, and allows the display unit to display the picture for a period equivalent to the number of the display fields. The display control section 115 analyzes the parameter of a subsequent picture for this period, thereby determining the number of the display fields. Then, the display control section 115 permits the display unit to display the subsequent picture after the passage of the display time for one picture.

With such constitution, if the relation between the parameter and the number of the display fields is defined, the MPEG video decoder can easily cope with peculiar play backs such as the 3-2 pull down play back and the ½ slow play back. For example, the number of the display fields at the time of the 3-2 pull down play back alone, the number of the display fields at the time of the ½ slow play back alone, and the number of the display fields at the time of both of the 3-2 pull down play back and the ½ slow play back are previously stored in the display control section 115 in the form of the table exemplified in FIG. 19. In determining the number of the display fields, the proper number of the display fields can be easily determined by referring to the table.

In the display control section 115, provided are four registers of a re-order register 115a, a current register 115b, a field delay register 115c and a display register 115d. These four registers 115a to 115d manage picture data stored in the decoding frame buffer 113. In this case, another MPEG video decoder of the present invention should provide a status register 116 so that states of the registers 115a to 115d can be easily grasped. If it is recognized by referring to the state of the status-register 116 that no data is stored in the re-order register 115a or the current register 115b, the decoding control section 114 outputs a decoding start command 112. Moreover, the display field number calculation section 115f refers to the status register 116, and if it is recognized that the data has been stored in the display register 115d, the display field number calculation section 115f determines the number of display fields of the picture corresponding to the data stored in the display register 115d.

Timings when the decoding control section 114 and the display control section 115 refers to the status register 116 can be set to that in synchronization with the vertical synchronous signal (V-Sync).

BRIEF DESCRIPTION OF THE DRAWINGS

For a more complete understanding of the present invention and the advantages thereof, reference is now made to the following description taken in conjunction with the accompanying drawings.

FIG. 4 is a schematic view showing a telecine conversion by a 3-2 pull down.

FIG. 19 is a figure showing a method for calculating the number of display fields of a second embodiment of the present invention.

FIG. 23 is a figure showing a table for realizing a 3-2 pull down play back, a ½ slow play back, a ⅓ slow play back, a ¼ slow play back and a ⅛ slow play back.

DETAILED DESCRIPTION OF THE PREFERRED EMBODIMENTS

Embodiments of the present invention will be described with reference to the accompanying drawings below.

First Embodiment

Figure 1:
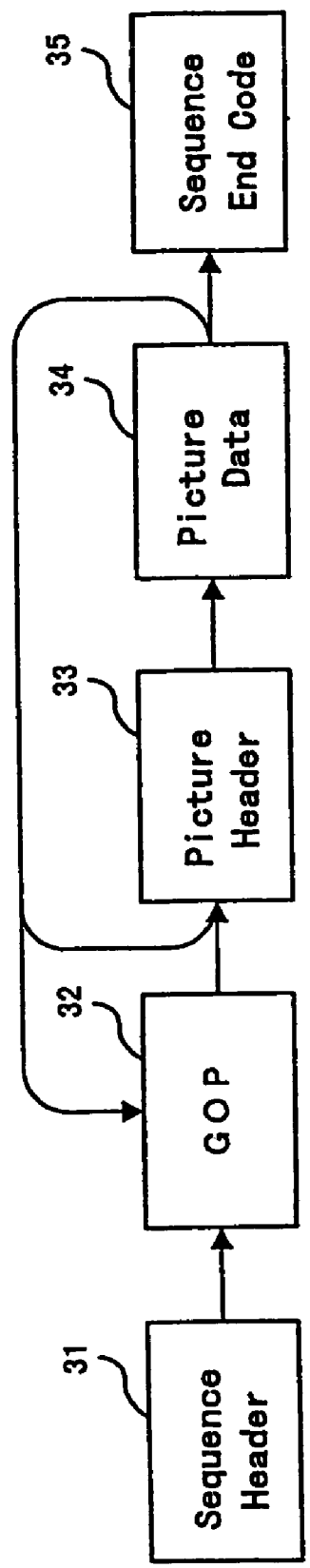
FIG. 1 is a schematic view showing a structure of a bit-stream of a MPEG.
Figure 2:
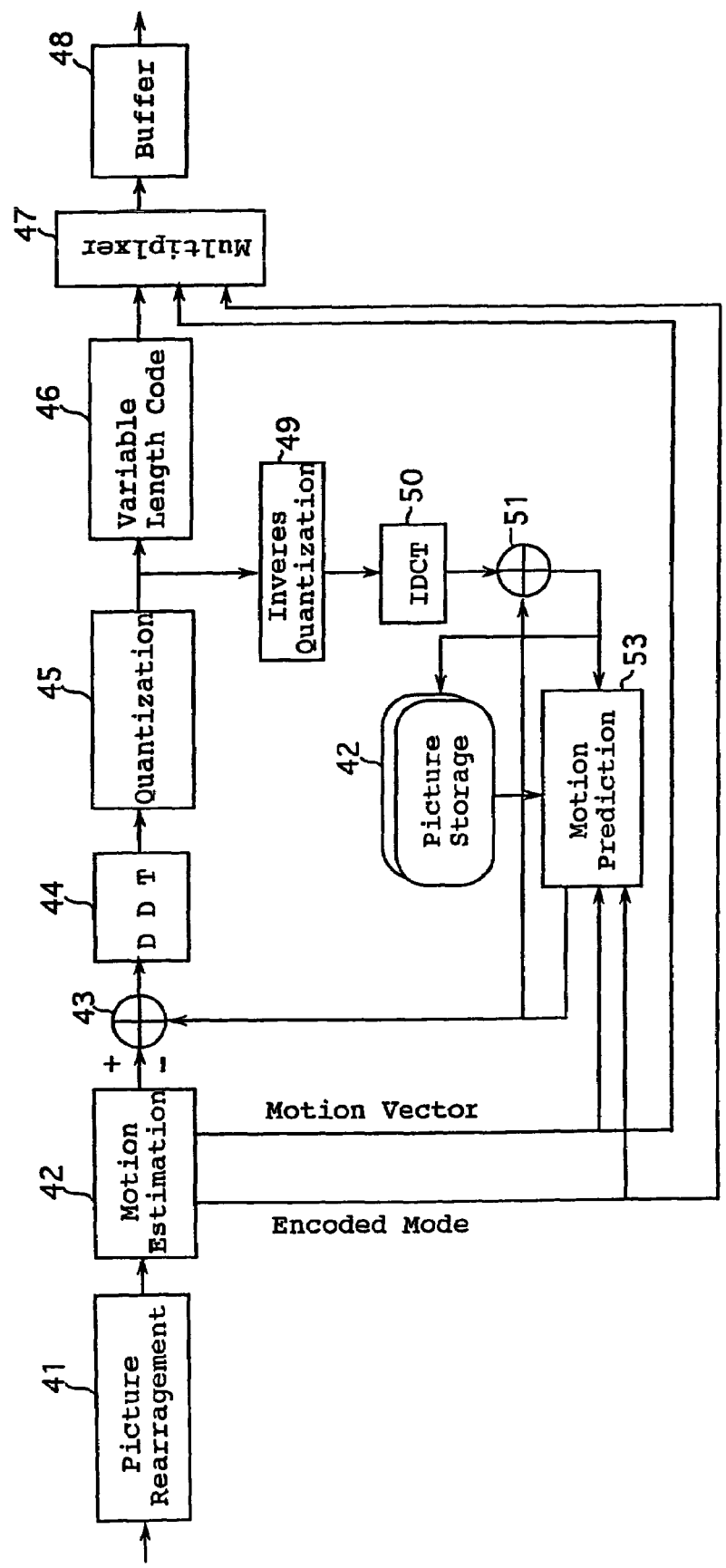
FIG. 2 is a block diagram showing a MPEG video encoder.
Figure 3:
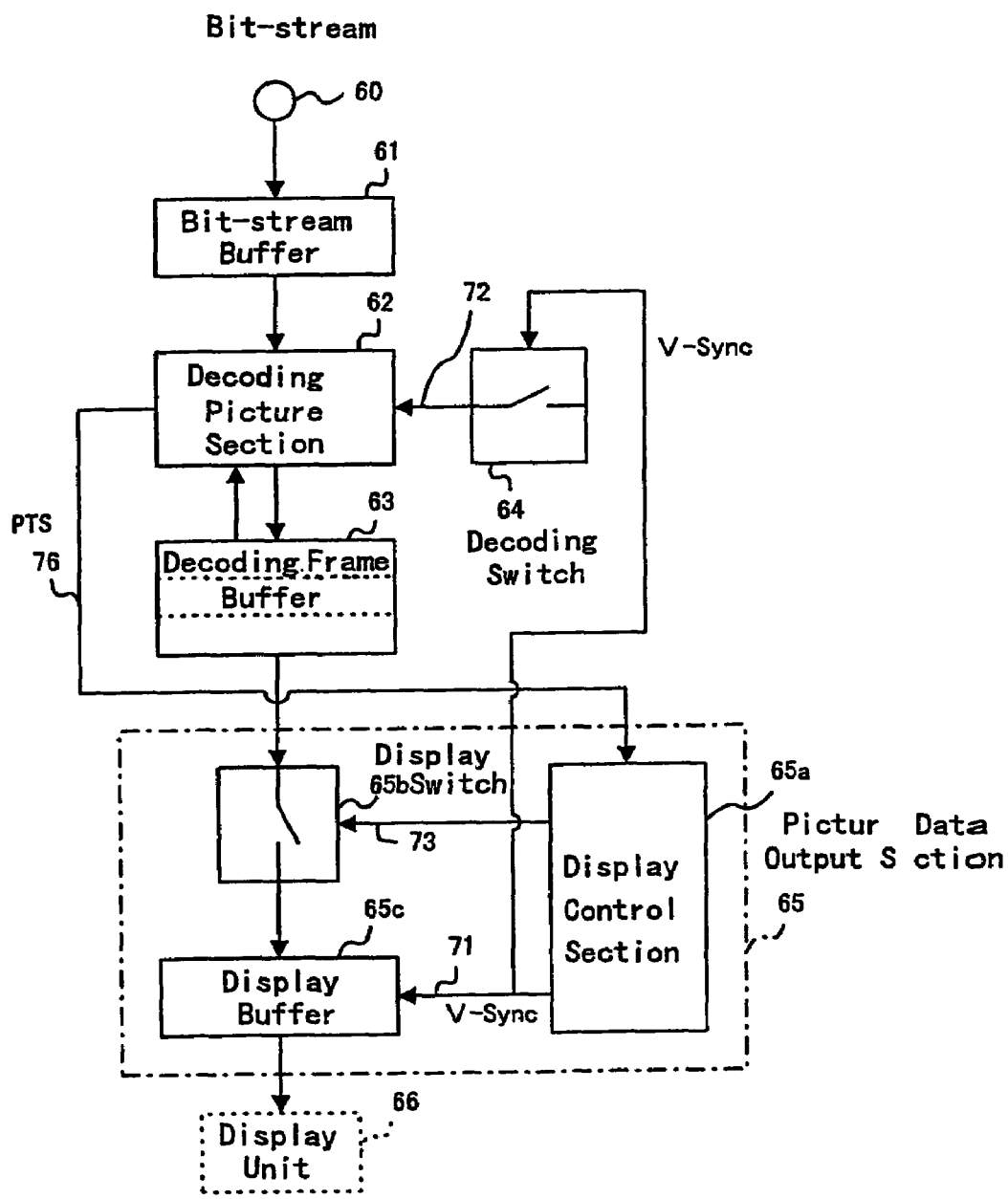
FIG. 3 is a block diagram showing an example (No. 1) of a MPEG video decoder.
Figure 5:
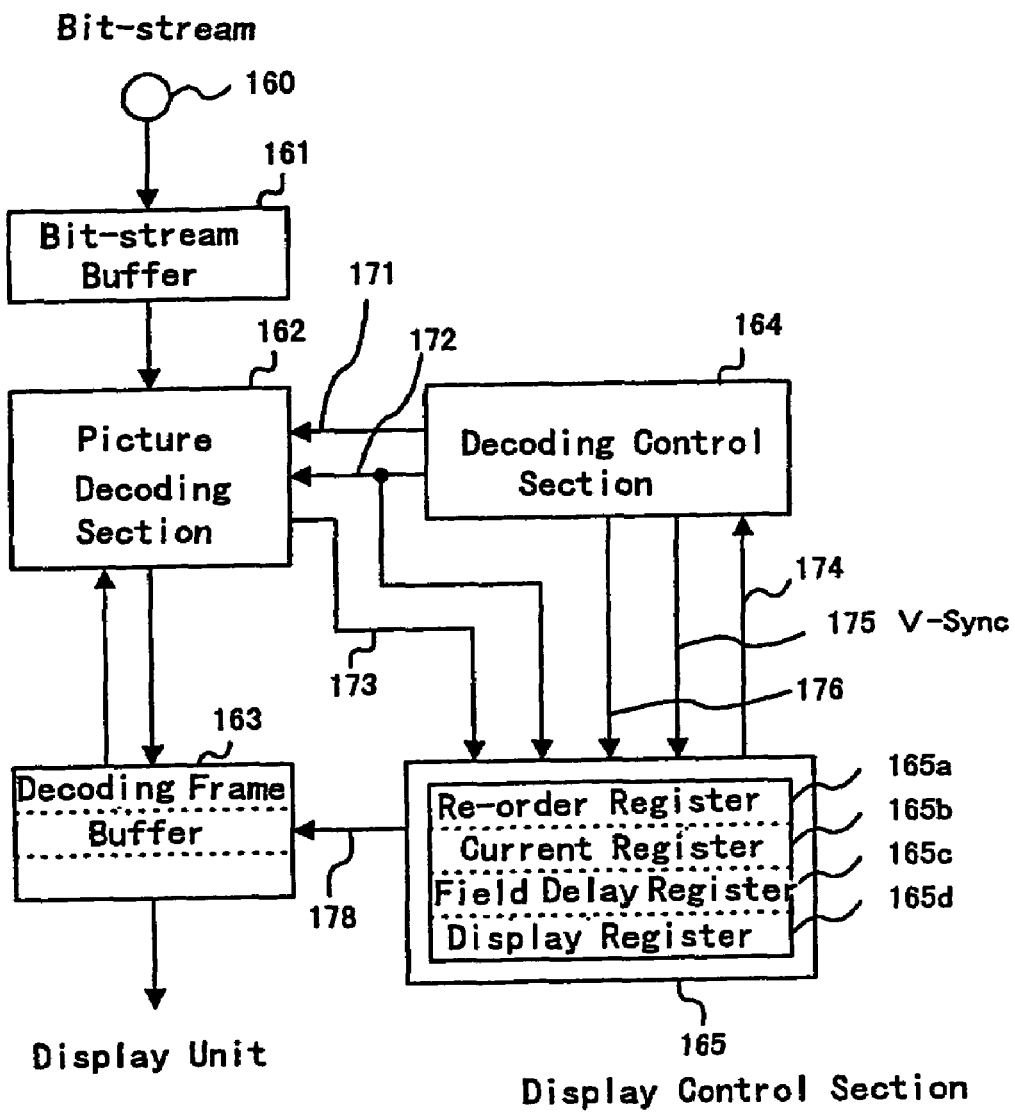
FIG. 5 is a block diagram showing an example (No. 2) of a MPEG video decoder.
Figure 6:
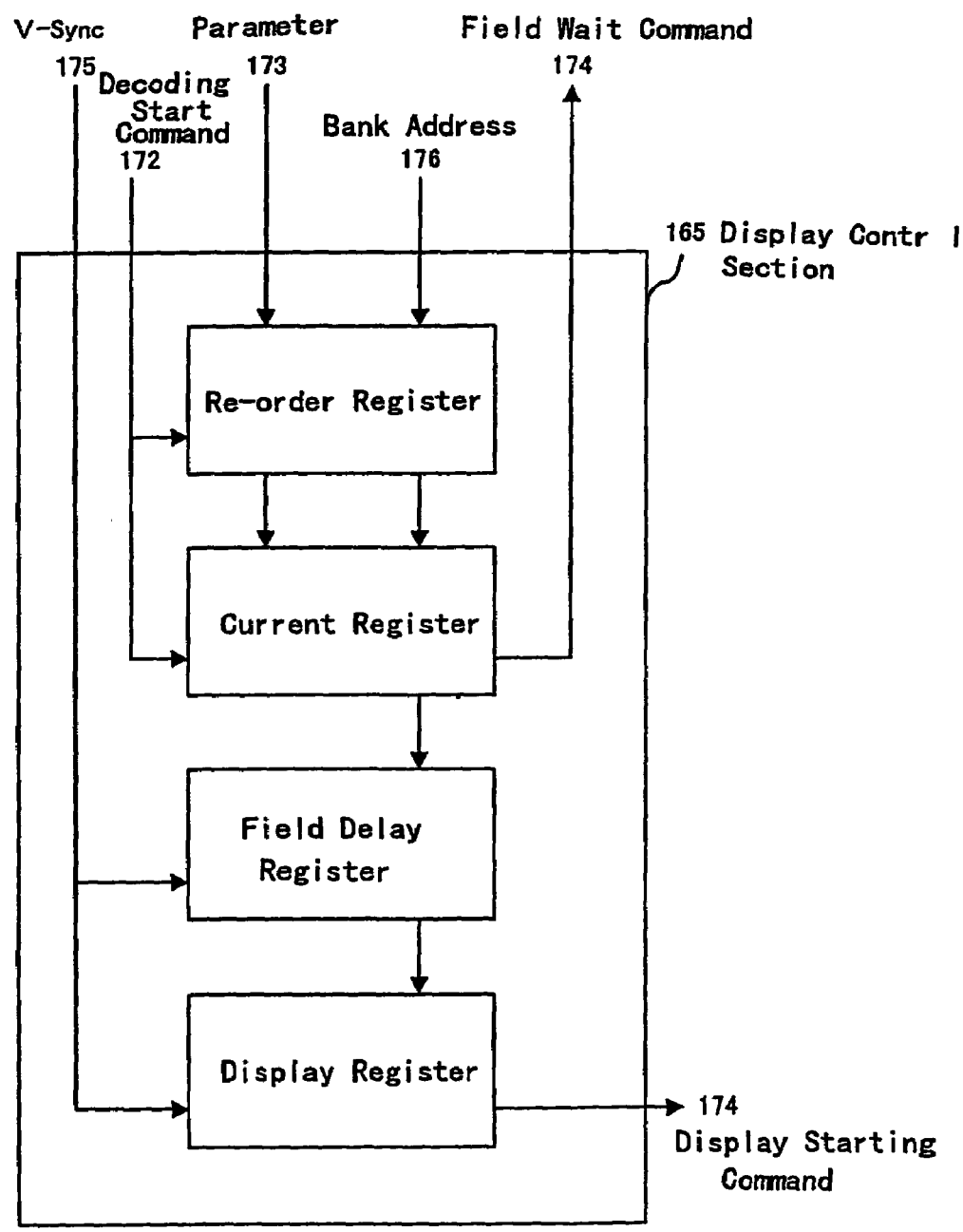
FIG. 6 is a block diagram showing a structure of a display control section of the MPEG video decoder of FIG. 5.
Figure 7:
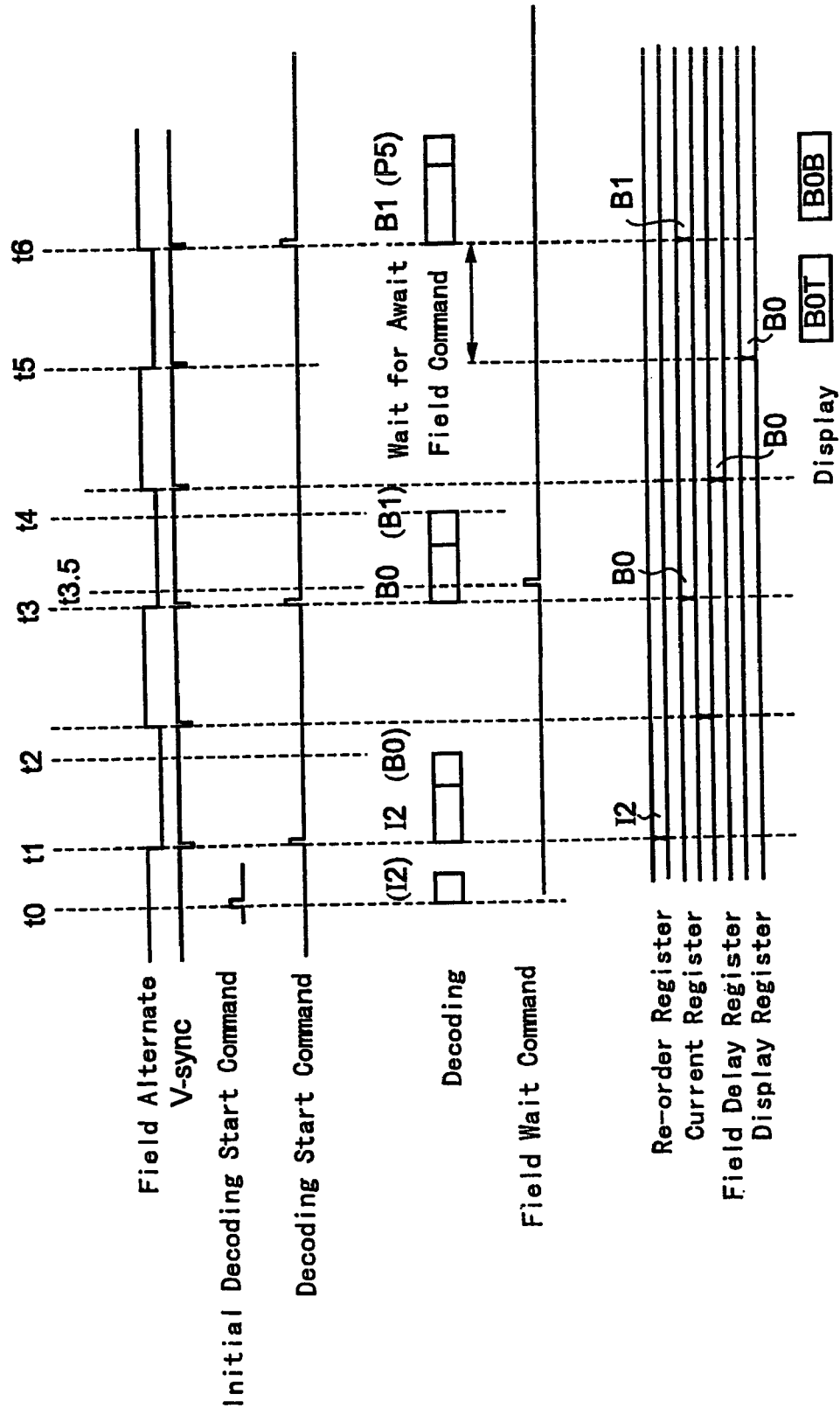
FIG. 7 is a timing chart (No.1) showing an operation of the MPEG video decoder of FIG. 5.
Figure 8:
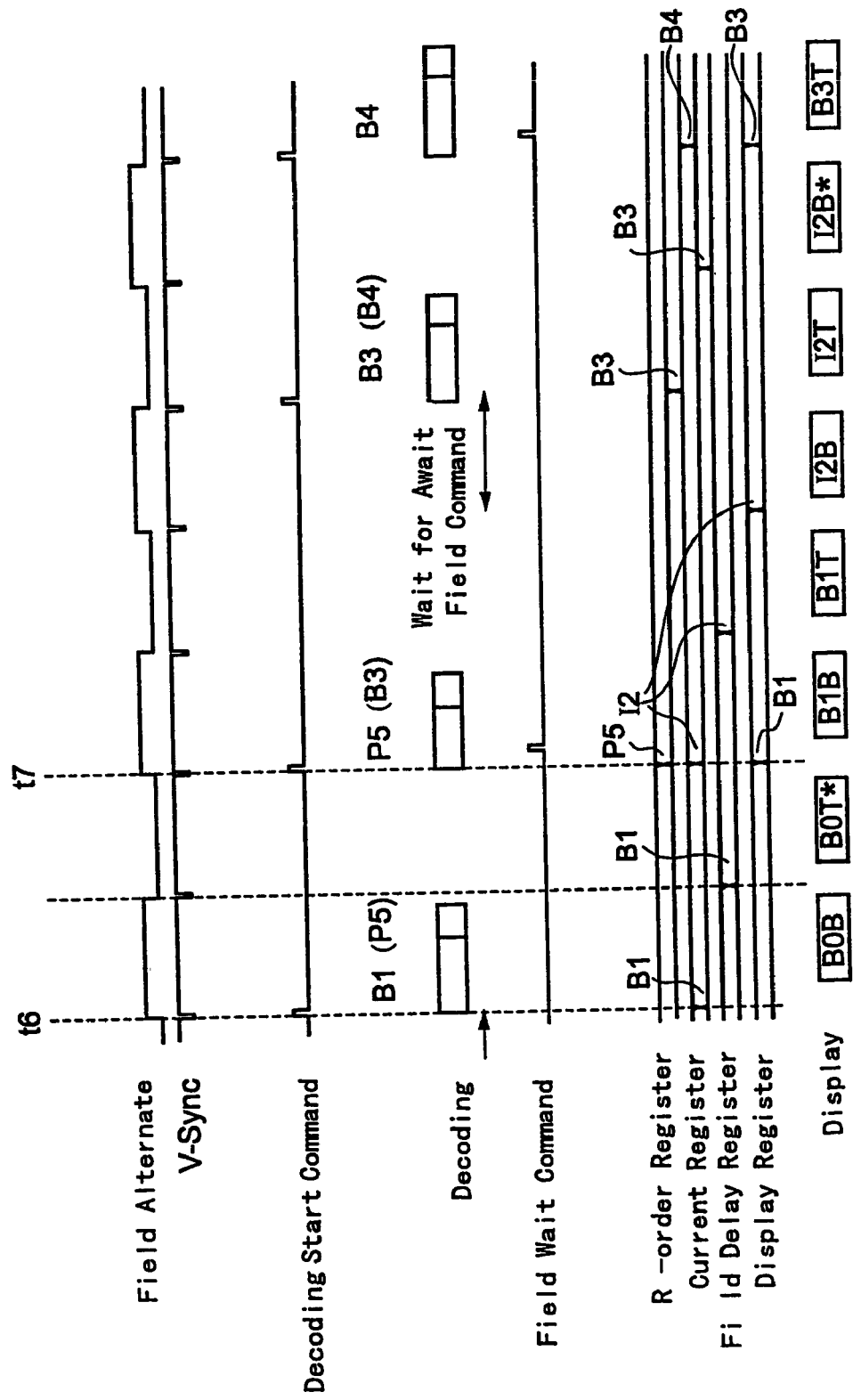
FIG. 8 is a timing chart (No.2) showing an operation of the MPEG video decoder of FIG. 5.
Figure 9:
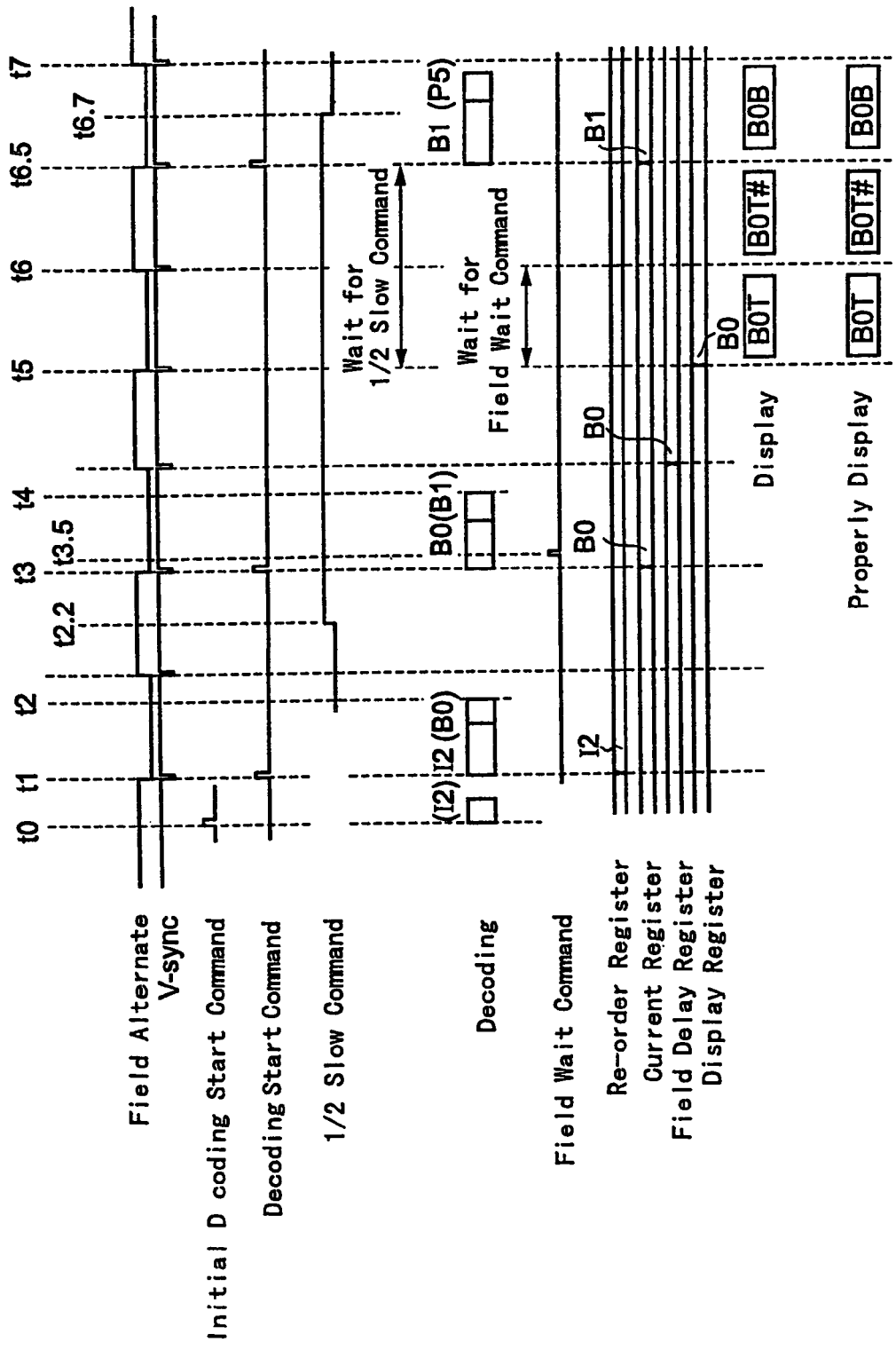
FIG. 9 is a timing chart (No.1) showing an operation at the time when a 3-2 pull down play back and a ½ slow play back are executed by the MPEG video decoder of FIG. 5.
Figure 10:
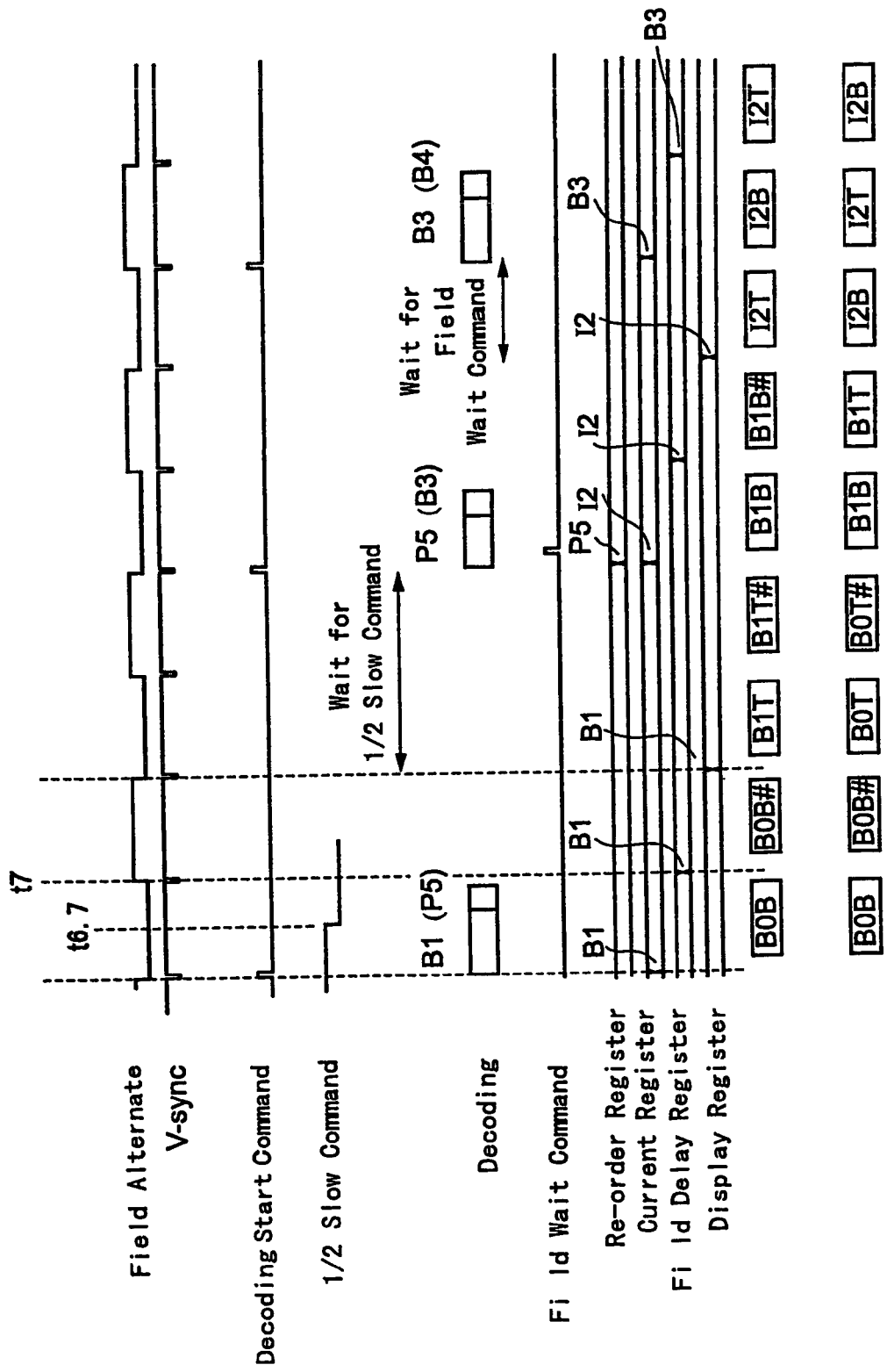
FIG. 10 is a timing chart (No.2) showing an operation at the time when a 3-2 pull down play back and a ½ slow play back are executed by the MPEG video decoder of FIG. 5.
Figure 11:
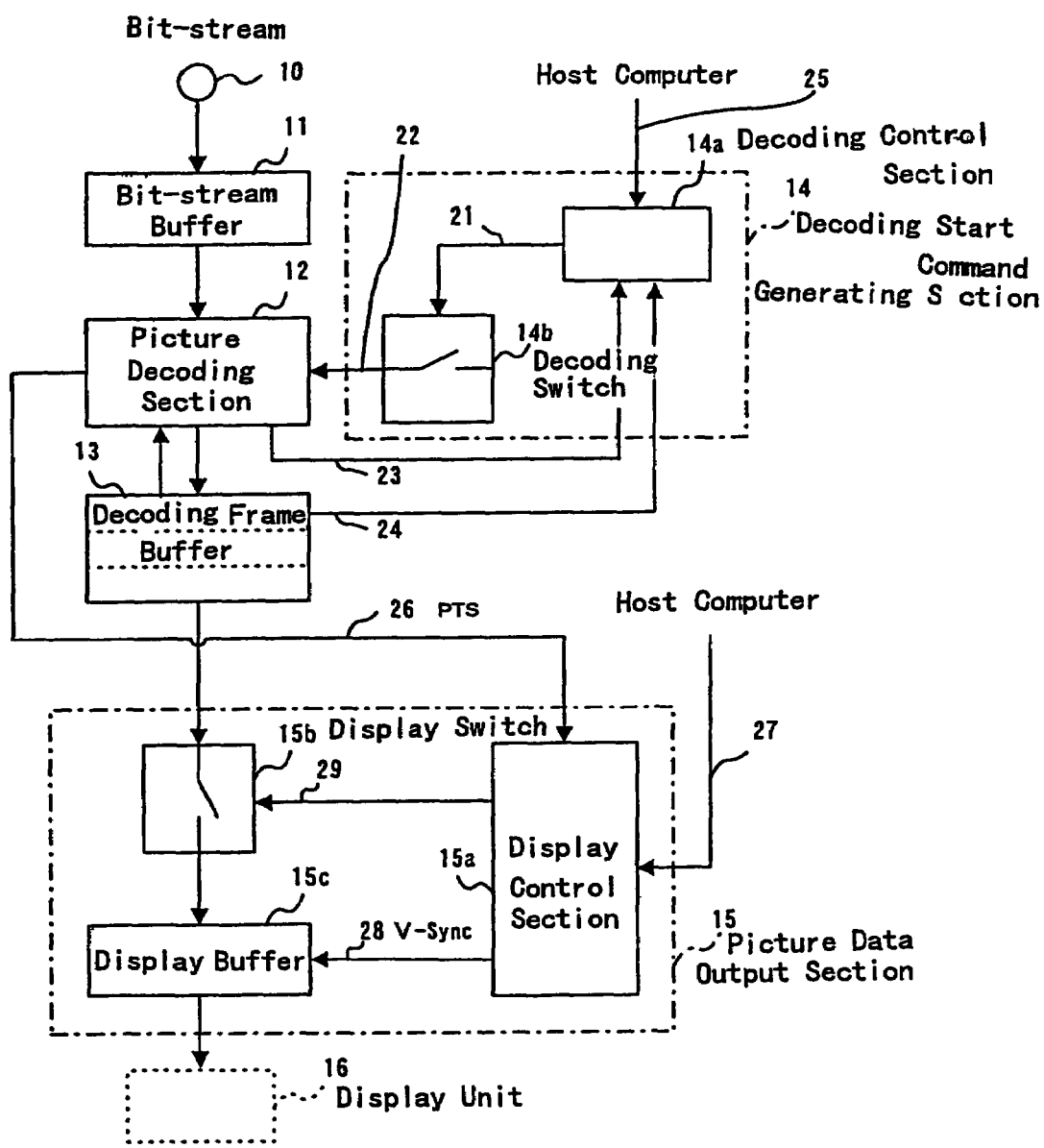
FIG. 11 is a block diagram showing a MPEG video decoder of a first embodiment of the present invention.

FIG. 11 is a block diagram showing a MPEG video decoder of a first embodiment of the present invention. The MPEG video decoder of the first embodiment of the present invention consists of a bit-stream input terminal 10, a bit-stream buffer 11, a picture decoding section 12, a decoding frame buffer 13, a decoding start command generating section 14 and a picture data output section 15.

A MPEG bit-stream is inputted to the bit-stream input terminal 10 from a storage media such as an ATM transmission path and a DVD. The bit-stream buffer 11 is a memory for temporarily storing the bit-stream.

The picture decoding section 12 receives the bit-stream from the bit-stream buffer 11, and performs a variable length decoding processing, an inverse quantization processing, an inverse discrete cosine transform processing and a motion prediction processing, thus decoding the bit-stream. Upon receipt of a decoding start command 22 from the decoding start command generating section 14, the picture decoding section 12 starts to decode the bit-stream for one picture. Then, when the picture decoding section 12 completes the decoding of the bit-stream for one picture, the pictur decoding section 12 outputs a decoding completion notification 23 to the decoding start command generating section 14. It should be noted that the picture decoding section 12 extracts a display time stamp (PTS) 26 from the bit-stream during decoding the bit-stream, and outputs the display time stamp PTS 26 to the picture data output section 15.

The decoding frame buffer 13 stores a plurality of decoded pictures. As described above, the picture includes three kinds of an I picture, a P picture and a B picture. When the picture decoding section 12 decodes the I picture, the picture decoding section 12 decodes the I picture without referring to other pictures. When the picture decoding section 12 decodes the P picture, the picture decoding section 12 refers to the picture in the past, i.e., the I picture or the P picture, which has been stored in the decoding frame buffer 13. In the case where the picture decoding section 12 decodes the B picture, the picture decoding section 12 refers to the pictures in the past and future, i.e., the I and P pictures, which have been stored in the decoding fram buffer 13. Accordingly, when the B picture is not used, in other words, when only the I and P pictures are used, the decoding of the pictures is performed in the displaying order. On the other hand, when the B picture is used, the order for decoding the pictures differs from that for displaying the pictures, so that the pictures are rearranged in the display order of the pictures by the decoding frame buffer 13.

The decoded picture must be stored in the decoding frame buffer 13 until the picture stored in the decoding frame buffer 13 is not referred to for the decoding of other pictures. Accordingly, the decoding frame buffer 13 has to possess a storage capacitance with a value that is large to some extent. Hereupon, for simplicity of the explanation, the decoding frame buffer 13 shall possess a storage capacitance equivalent to three pictures and one or two pictures that were decoded prior to the P and B pictures shall be referred to when either the P picture or the B picture is decoded. When the decoding frame buffer 13 stores the predetermined number of pictures, i.e., three pictures in this example, the decoding frame buffer 13 outputs the bufferfull notification 24.

The decoding start command generating section 14 consists of a decoding control section 14a and a decoding switch 14b. The decoding control section 14a outputs a decoding starting permission 21 based on a bit-stream transfer notification 25 transmitted from the outside, i.e., a host computer, the decoding completion notification 23 outputted from the picture decoding section 12, and the bufferfull notification 24 outputted from the decoding frame buffer 13. Specifically, when the decoding control section 14a receives the bit-stream transfer notification 25 from the host computer, the decoding completion notification 23 is outputted from the picture decoding section 12 to the decoding control section 14a, and the bufferfull notification 24 is not outputted from the decoding frame buffer 13 to the decoding control section 14a, the decoding control section 14a outputs the decoding starting permission 21. In response to the output of the decoding staring permission 21 from the decoding control section 14a, the decoding switch 14b outputs the decoding start command 22 to the picture decoding section 12.

In this embodiment of the present invention, the host computer shall output the bit-stream transfer notification when the host computer transfers the bit-stream for one picture or more to the bit-stream buffer 11. Accordingly, after the bit-stream for one picture or more is stored in the bit-stream buffer 11, the picture decoding section 12 starts to decode a first picture.

The picture data output section 15 consists of a display control section 15a, a display switch 15b and a display buffer 15c. If the display time stamp (PTS) 26 of the decoded picture is coincident with a self reference clock (STC), the display control section 15a outputs a transfer command 29 to the display switch 15b. Upon receipt of the transfer command 29, the display switch 15b transfer picture data from the decoding frame buffer 13 to the display buffer 15c. The picture data stored in the display buffer 15c is transmitted to the display unit 16 in synchronization with the vertical synchronous signal V-Sync 28 outputted from the display control section 15a. Thus, the image is displayed on the display unit 16.

It should be noted that the display unit 16 may adopt a NYSC (National Television System Committee) scheme or a PAL (Phase Alternation Line) scheme. Moreover, it should be noted that picture decoding section 12, the decoding control section 14a and the display control section 15a may be realized in the form of hardware (semiconductor device) or software.

Figure 12:
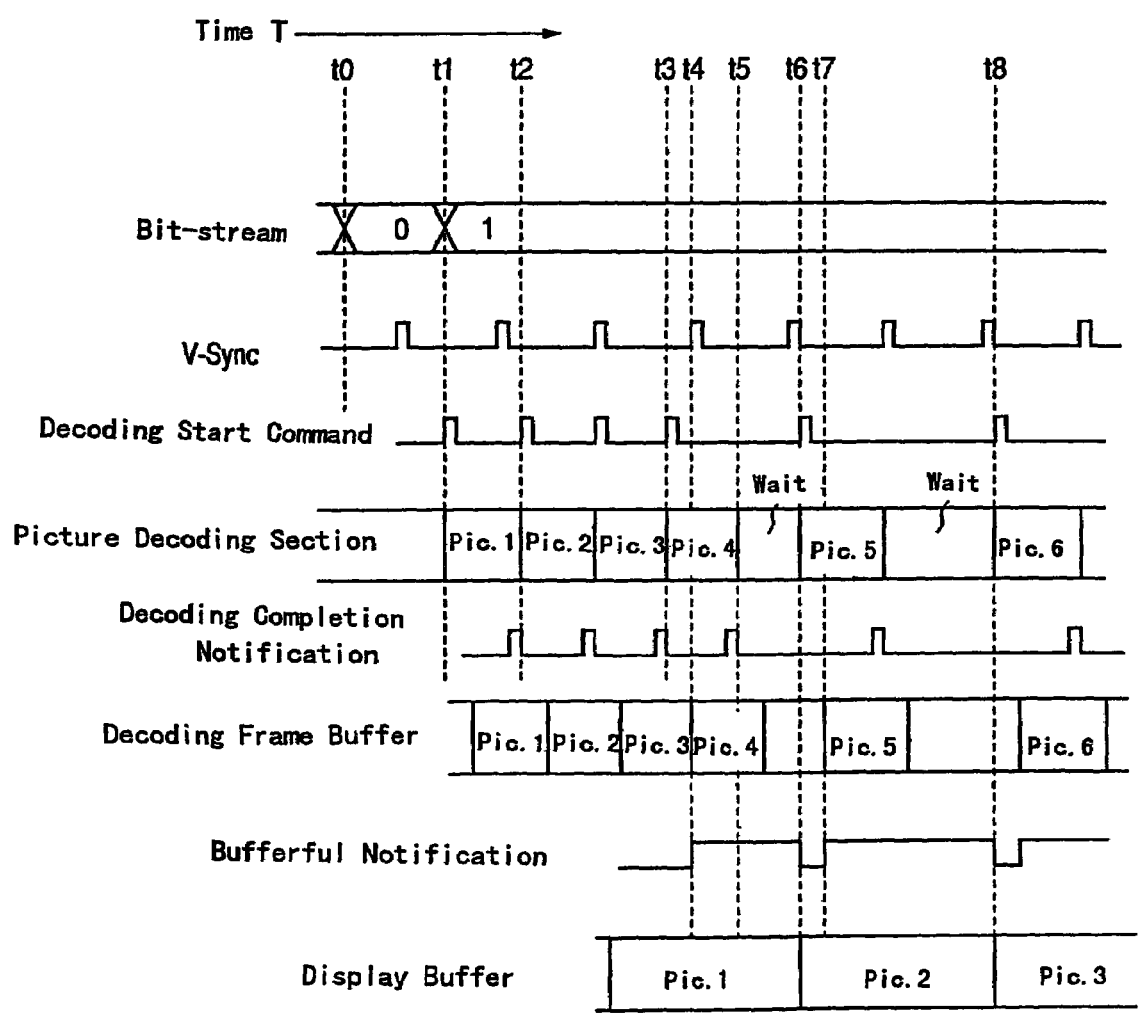
FIG. 12 is a timing chart showing an operation of the MPEG video decoder of the first embodiment of the present invention.

FIG. 12 is a timing chart showing an operation of the MPEG video decoder of this embodiment.

It is assumed that the input of the bit-stream to the bit-stream buffer 11 from the input terminal 10 is started at the time t0. When the storage of the bit-stream for one picture in the bit-stream buffer 11 is completed at the time t1, the bit-stream transfer notification 25 is inputted from the host computer to the decoding control section 14a, so that the decoding control section 14a outputs the decoding starting permission 21. Upon receipt of the decoding starting permission 21 from the decoding control section 14a, the decoding switch 14b outputs the decoding start command 22 to the picture decoding section 12. Thus, the picture decoding section 12 starts to decode the first picture data, i.e., picture 1, and the decoding frame buffer 13 stores the decoded picture data.

When the decoding of the picture 1 is completed at the time t2, the picture decoding section 12 outputs the decoding completion notification 23 to the decoding control section 14a. Thereafter, the storage of the picture 1 into the decoding frame buffer 13 is completed slightly after the time t2. At this time, since only a storage area for one picture is used among the storage areas for three pictures stored in the decoding frame buffer 13, the bufferfull notification 24 is not outputted from the decoding frame buffer 13 to the decoding control section 14a. Therefore, upon receipt of the decoding completion notification 23 from the picture decoding section 12, the decoding control section 14a outputs the decoding starting permission 21 to the decoding switch 14b. Subsequently, the decoding switch 14b outputs the decoding start command 22 to the picture decoding section 12. Thus, the picture decoding section 12 starts to decode the second picture, i.e., picture 2.

The picture decoding section 12 outputs the decoding completion notification 23 when the decoding of the picture 2 is completed. As a result, the decoding control section 14a outputs the decoding starting permission 21 to the decoding switch 14b, and outputs the decoding start command 22 to the picture decoding section 12. Then, the picture decoding section 12 starts to decode a third picture data (picture 3).

On the other hand, the display control section 15a outputs the transfer command 29 to the display switch 15b, and the decoding frame buffer 13 transfers the first picture data (picture 1) to the display buffer 15c. Then, the display buffer 15c transmits the picture 1 to the display unit 1 in synchronization with the vertical synchronous signal V-Sync 28. Thus, an image originating from the picture 1 is displayed on the display unit 16 for one frame period (two vertical synchronous period).

When the decoding of the picture 3 is completed at the time t3, the decoding completion notification 22 is outputted from the picture decoding section 12 to the decoding control section 14a. As a result, the decoding control section 14a outputs the decoding starting permission 21, and the decoding switch 14b outputs the decoding start command 22 to the picture decoding section 12, so that the picture decoding section 12 starts to decode a fourth picture data (picture 4).

On the other hand, the decoding frame buffer 13 starts to store the picture 4 at the time t4, and outputs the bufferfull notification 24 to the decoding control section 14a.

With completion of the decoding of the picture 4 at the time t5, the picture decoding section 12 outputs the decoding completion notification 23 to the decoding control section 14a. However, since the bufferfull notification 24 is outputted from the decoding frame buffer 13 to the decoding control section 14a, the decoding control section 14a does not output the decoding starting permission 21. Therefore, the picture decoding section 12 suspends the decoding of the picture data.

With completion of the displaying of the image originating from the picture 1 at the time t6, the display control section 15a compares the self reference clock (SCR) with the display time (PTS) of the picture data stored in the decoding frame buffer 13. As a result of the comparison, since a time to output the picture 2 can be known, the display control section 15a outputs the transfer command 29 to the display switch 15b, and th picture 2 is transferred from the decoding frame buffer 13c to the display buffer 15c via the display switch 15b. Then, the picture 2 is transmitted from the display buffer 15c to the display unit 16 in synchronization with the vertical synchronous signal V-Sync 28. Thus, an image originating from the picture 2 is displayed on the display unit 16.

On the other hand, since the picture 2 is transferred from the decoding frame buffer 13 to the display buffer 15c via the display switch 15b, a space is produced in the storage area of the decoding frame buffer 13. Thus, the output of the bufferfull notification 24 from the decoding frame buffer 13 is stopped. As a result, the decoding starting permission 21 is outputted from the decoding control section 14a to the decoding switch 14b, and then the decoding start command 22 is outputted from the decoding switch 14b to the picture decoding section 12. Upon receipt of the decoding start command 22, the picture decoding section 12 starts to decode a fifth picture data (picture 5).

As soon as the storage of the picture 5 in the decoding frame buffer 13 is started at the time t7, the decoding frame buffer 13 outputs the bufferfull notification 24 to the decoding control section 14a. Thus, although the decoding completion notification 23 is outputted from the picture decoding section 12 to the decoding control section 14a after the completion of the decoding for the picture 5, the decoding control section 14a does not output the decoding starting permission 21. Accordingly, after the decoding of the picture 5 is completed, the picture decoding section 12 suspends the decoding processing.

With completion of the displaying of the image originating from the picture at the time t8, the display control section 15a allows the display switch 15b to be ON, so as to transfer the picture 3 from the decoding frame buffer 13 to the display buffer 15c. Then, the display control section 15a transfers the picture 3 from the display buffer 15c to the display unit 16 in synchronization with the vertical synchronous signal V-Sync 28. Thus, an image originating from the picture 3 is displayed on the display unit 16.

Moreover, since the picture 3 is transferred from the decoding frame buffer 13 to the display buffer 15c, a space is produced in the storage area of the decoding frame buffer 13, so that the output of the bufferfull notification 24 from the decoding frame buffer 13 is stopped. Accordingly, the decoding starting permission 21 is outputted from the decoding control section 14a to the decoding switch 14b, and the decoding start command 22 is outputted from the decoding switch 14b to the picture decoding section 12. Thus, the picture decoding section 12 starts to decode sixth picture data (picture 6).

As described above, the MPEG video decoder of this embodiment starts the decoding of the picture data at the timings in response to both of the decoding completion notification 23 outputted from the picture decoding section 12 and the bufferfull notification 24 outputted from the decoding frame buffer 13.

Figure 13:
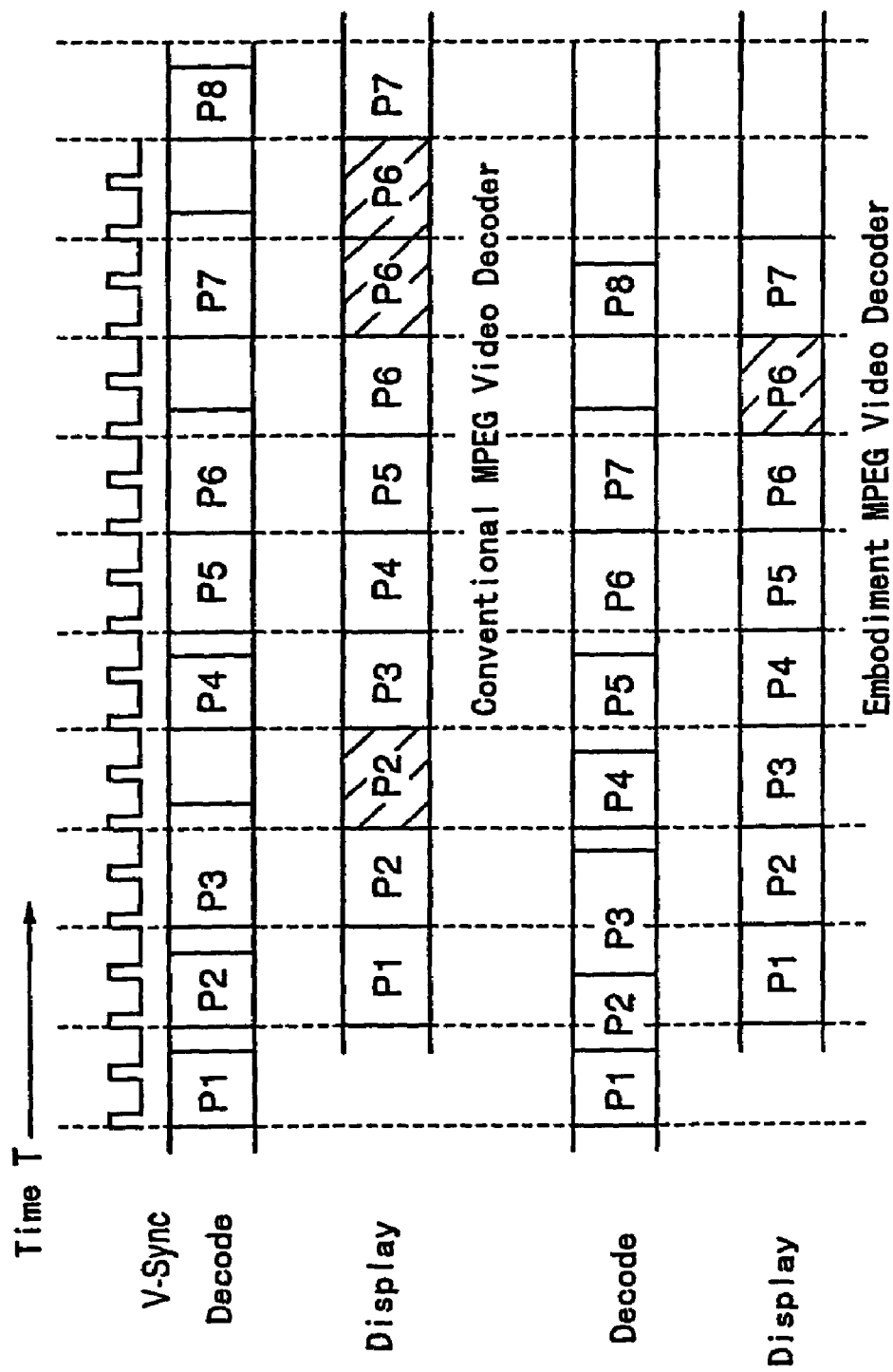
FIG. 13 is a figure for comparing a likelihood of an error concealment in the MPEG video decoder of the first embodiment of the present invention with that of a MPEG video decoder which starts a decoding of a bit-stream in synchronization with a vertical synchronous signal V-Sync.

FIG. 13 is a figure for comparing a likelihood of an error concealment in the MPEG video decoder of this embodiment with that of the conventional MPEG video decoder which starts the decoding of the picture data in synchronization with the vertical synchronous signal V-Sync. In FIG. 13, the hatched portions show frames in which the error concealment occurs.

As shown in FIG. 13, in the bit-stream including many pictures which cannot be decoded within one frame time, i.e., P3, P6 and P7 in FIG. 13, when the decoding of the data for one picture is not completed within one frame time (two vertical synchronous periods), the conventional MPEG video decoder, which start the decoding in synchronization with the vertical synchronous signal V-Sync, always causes the error concealment. On the other hand, since, with an existence of a space in a storage area of the decoding frame buffer 13, the MPEG video decoder of this embodiment decodes the pictures consecutively, the error concealment may be avoided even when the decoding of the data for one picture is not completed within one frame time. In the example shown in FIG. 13, the error concealment occurs only once.

As described above, the MPEG video decoder of this embodiment, the timing for starting the decoding is not in synchronization with the vertical synchronous signal V-Sync 28. Specifically, if there is a space in the storage area of the decoding frame buffer 13, the decoding of the bit-stream is consecutively performed in the picture decoding section 12. Thus, even when one frame time or more is taken for decoding the data for one picture, the occurrence of the error concealment can be avoided, thus to reproduce the moving picture smoothly.

Figure 14:
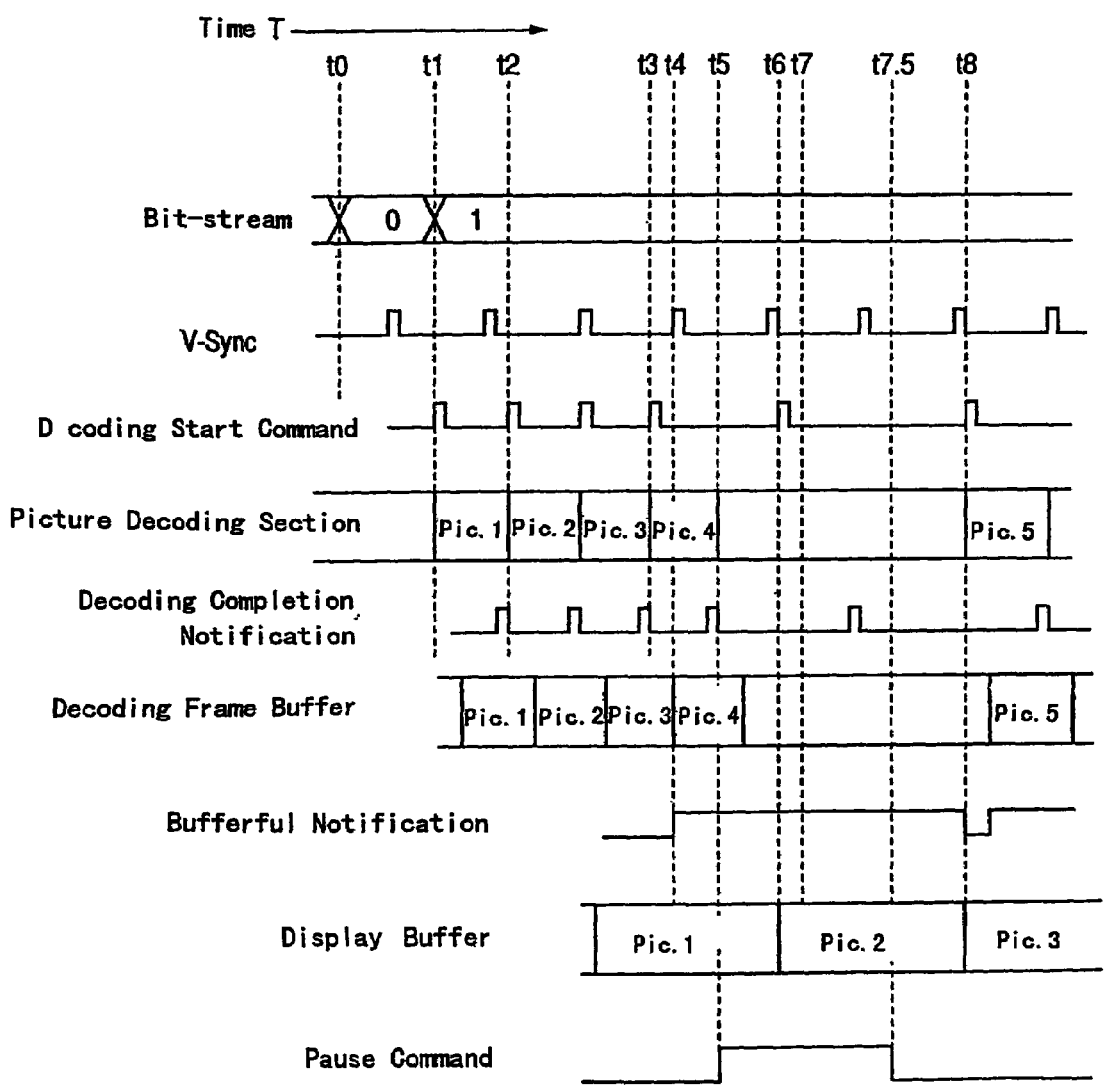
FIG. 14 is a timing chart showing an operation of the MPEG video decoder of the first embodiment of the present invention at the time of a display pause (temporal stop of displaying).

FIG. 14 is a timing chart showing an operation of the MPEG video decoder of this embodiment at the time of a display pause (temporal stop of displaying).

It is assumed that the pause command 27 (see FIG. 11) is outputted from the host computer to the display control section 15a from the time t5 to t7.5. At the time t5, an image originating from the picture 1 is displayed on the display unit 16. Moreover, the pictures 2 and 3 are stored in the decoding frame buffer 13. The picture decoding section 12 has just completed the decoding of the picture 4, and the picture 4 is being stored in the decoding frame buffer 13.

When the pause command 27 is inputted from the host computer to the display control section 15a, the display control section 15a does not turn on the display switch 15b, though the self reference clock (SCR) coincides with the display time stamp (PTS) of the picture stored in the decoding frame buffer 13. For this reason, the data of the display buffer 15c is not updated even at the time t6, and the display control section 15a transmits the picture 1 to the display unit 16 again in synchronization with the vertical synchronous signal V-Sync 28. Thus, the display unit 16 displays the picture originating from the picture 1 again. Moreover, since the decoding frame buffer 13 is in the situation where the buffer 13 stores three pictures, the decoding frame buffer 13 continues to output the bufferfull notification 24. Accordingly, the decoding starting permission 21 is not outputted from the decoding control section 14a, and the picture decoding section 12 suspends the decoding of a subsequent picture.

With stopping of the output of the pause command 27 at the time t7.5, the display control section 15a outputs the transfer command 29 to the display switch 15b, and the picture 2 is transferred from the decoding frame buffer 13 to the display buffer 15c. Then, the display control section 15a transmits the picture 2 to the display unit 16 in synchronization with the vertical synchronous signal V-Sync 28. Furthermore, since a space is produced in the storage area of the decoding buffer frame 13, the output of the bufferfull notification 24 is stopped. In response to the stop of the output of the bufferfull notification 24, the decoding control section 14a outputs the decoding starting permission 21 to the decoding switch 14b, and the decoding switch 14b outputs the decoding start coed 22 to the picture decoding section 12. With the output of the decoding start command 22, the picture decoding section 12 starts to decode the picture 5. Thus, the display pause is realized.

Although the decoding is started at the time the bit-stream for one picture or more is transferred to the bit-stream buffer 11 in the above described embodiment, conditions for starting the decoding are not limited to this.

Moreover, the MPEG video decoder of this present invention may be constructed such that instead of the bit-stream transfer notification 25 supplied from the host computer, a signal (bit-stream storage signal) is outputted from the bit-stream buffer 11 to the decoding control section 14a when a certain quantity of the bit-stream is stored in the bit-stream buffer 11. In this case, the decoding control section 14a outputs the decoding starting permission 21 in response to the bit-stream storage signal supplied from the bit-stream buffer 11, the decoding completion notification 23 supplied from the picture decoding section 12 and the bufferfull notification 23 supplied from the decoding frame buffer 13.

Second Embodiment

Figure 15:
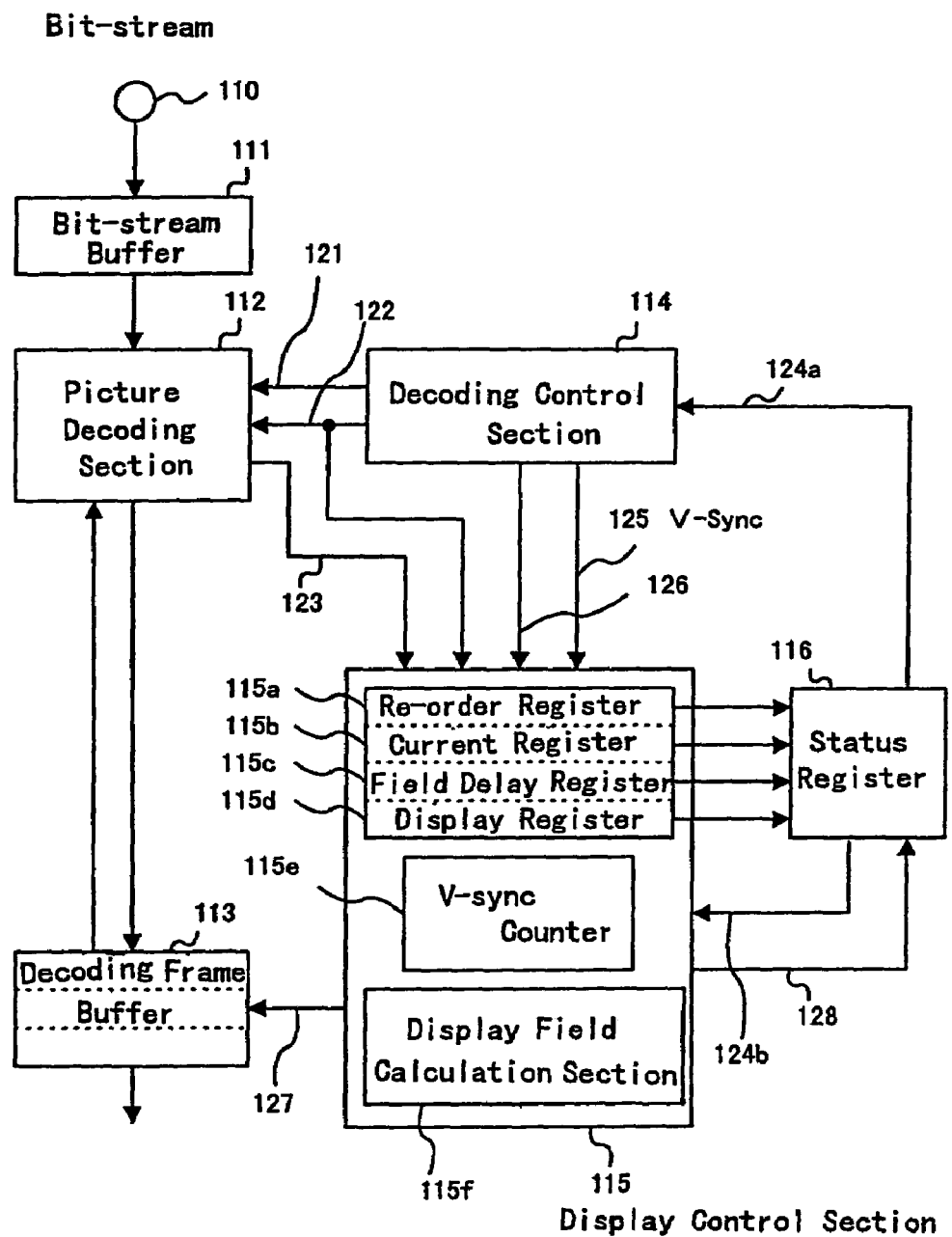
FIG. 15 is a block diagram showing a MPEG video decoder of a second embodiment of the present invention.

FIG. 15 is a block diagram showing a MPEG video decoder of a second embodiment of the present invention. The MPEG video decoder of this embodiment consists of a bit-stream input terminal 110, a bit-stream buffer 111, a picture decoding section 112, a decoding frame buffer 113, a decoding control section 114, a display control section 115 and a status register 116.

The bit-stream buffer 111 stores a bit-stream supplied from the input terminal 110, and sequentially outputs the bit-stream for one picture to the picture decoding section 112. As soon as a decoding start command 122 is issued from the decoding control section 114, the picture decoding section 112 starts to decode the bit-stream sent from the bit-stream buffer 111. The picture decoded by the picture decoding section 112 is stored in the decoding frame buffer 113.

The decoding frame buffer 113 has a storage area for, for example, three pictures. The storage area is divided into a plurality of banks, and one picture is stored in one bank. Moreover, as soon as a display starting command 127 is issued from the display control section 115, the decoding frame buffer 113 transmits the picture corresponding to the bank address included in the display starting command 127 to the display unit.

The decoding control section 114 issues the decoding start command 122 to the picture decoding section 112 in synchronization with a vertical synchronous signal V-Sync outputted from a V-Sync generator (not shown). This decoding start command 122 is issued principally once for a period of two field, that is, once for a period of one frame.

When a certain quantity of the bit-stream is stored in the bit-stream buffer 111 after the supply of the power source (after a cold start), the decoding control section 114 issues an initial decoding start command 121 irrespective of the V-Sync.

The display control section 115 includes a V-Sync counter 115e and a display field number calculation section 115f, in addition to four registers of a re-order register 115a, a current register 115b, a field delay register 115c, and a display register 115d.

Figure 16:
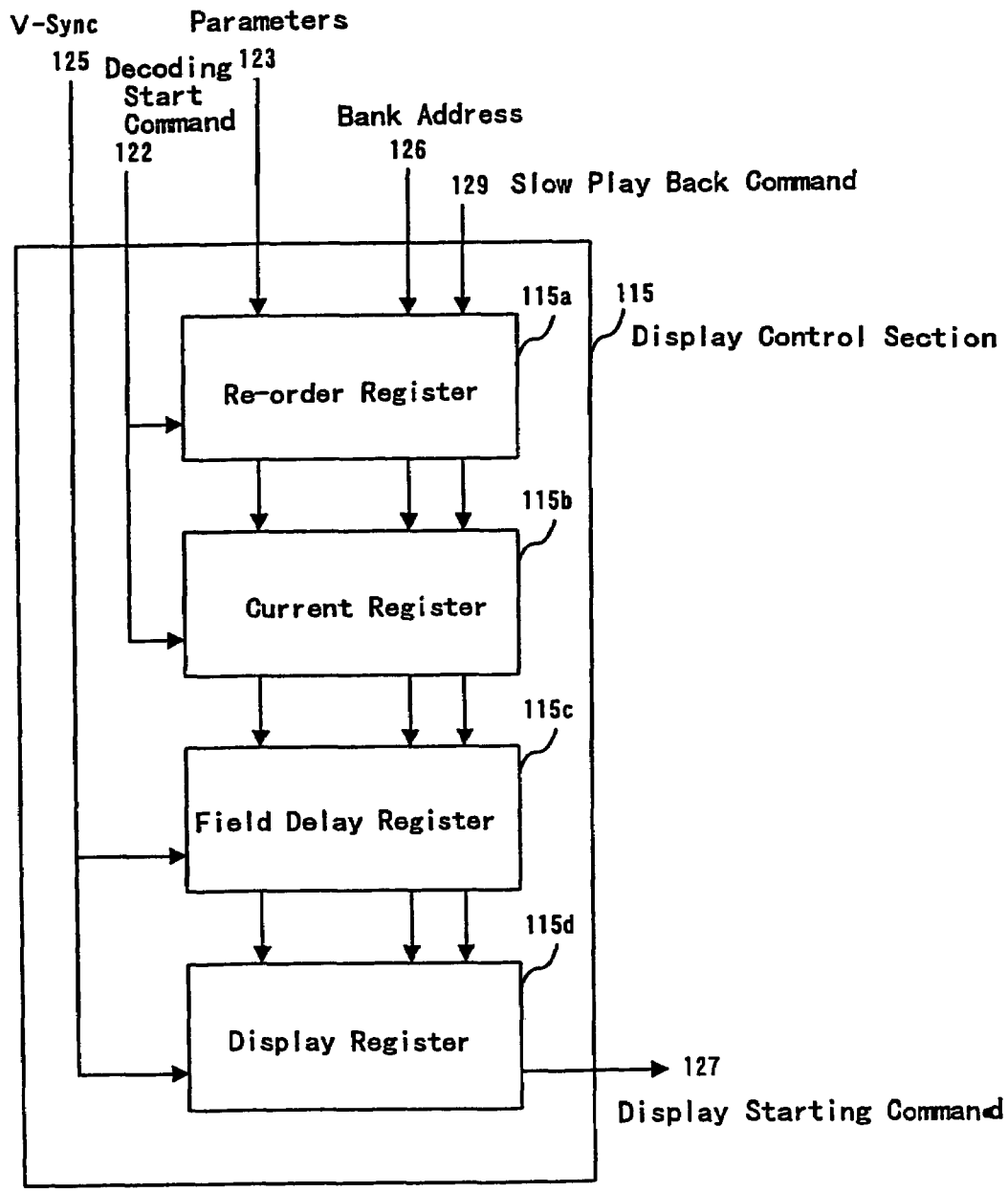
FIG. 16 is a block diagram showing a display control section of a second embodiment of the present invention.

In this embodiment, parameters are transferred to the display register 115d, as shown in FIG. 16. In this embodiment, since it is required for the display control section 115 to determine for each picture the number of fields to be displayed, a repeat first field flag is transferred to the display register 115d. Moreover, also a ½ slow play back command flag is transferred to the display register 115d as a parameter. The display control section 115 samples a slow play back command 129 from the outside using a decoding start command as a trigger, and if the slow play back command 129 is "1", the display control section 115 transfers the slow play back command 129 as a slow play back flag to the display register 115d.

In the display control section 115, the display field number calculation section 115f serves to control the number of display fields to be displayed. An operation of the display field number calculation section 115f is described later. The V-Sync counter 115e counts the number of V-Sync pulses equivalent to the number of display fields determined by the display field number calculation section 115f, and the display field number calculation section 115f uses the number of V-Sync pulses for controlling the number of display fields.

The status register 116 monitors the states of the re-order register 115a, current register 115b, field delay register 115c and display register 115d, and expresses the states by a four bit signal. Specifically, if data such as a parameter and a bank address is stored in these registers 115a to 115d, a value of a bit corresponding to the register is set to "1", and if the data is not stored, the value of the bit corresponding to the register is set to "0". The bits are arranged in the order of the re-order, current, field delay and display registers from MSB (Most Significant Bit). For example, if the data is stored in any of the four registers 115a to 115d, a value of the status register 116 is "1111", and if the data is not stored in any of the four registers 115a to 115d, the value of the status register 116 is "0000".

Figure 17:
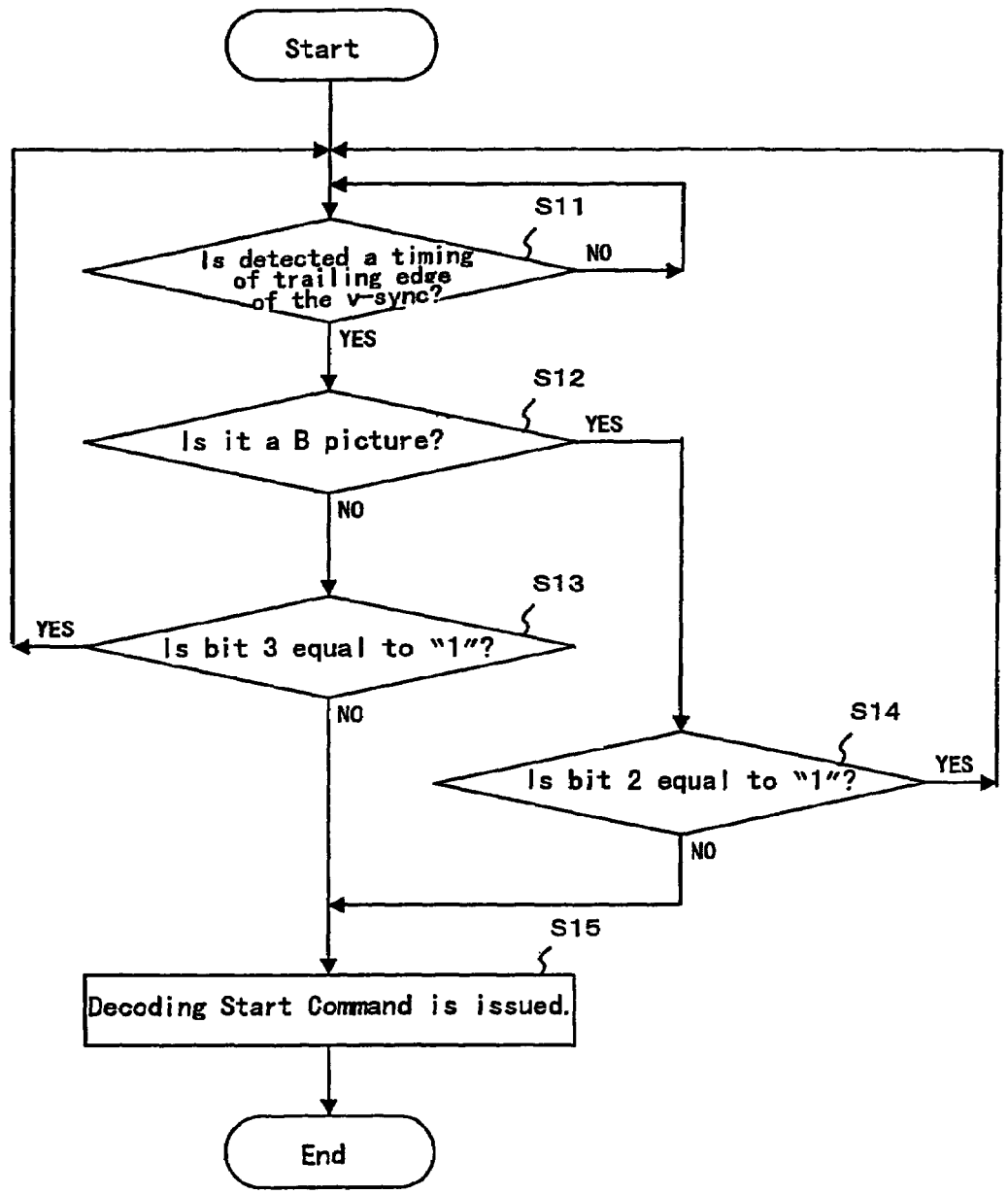
FIG. 17 is a flow chart showing an operation of a decoding control section of a second embodiment of the present invention.

FIG. 17 is a flow chart showing an operation of the decoding control section 114. In step S11, a timing of a trailing edge of the V-Sync produced by the built-in V-Sync generator is detected. Then, the procedure proceeds to a step S12 in response to the trailing edge of the V-Sync, and it is decided whether or not a picture to be decoded is a B picture. When the picture is not the B picture, that is, when the picture is either an I picture or a P picture, the procedure proceeds to a step S13, and it is decided whether or not a bit 3 of the status register 13 is "1". When the bit 3 is "1", that is, when data is stored in the re-order register 115a, the procedure returns from the step S13 to the step S11. When the bit 3 is "0" in the step S13, that is, when data is stored in the re-order register 115a, the procedure proceeds to the step S15, so that the decoding start command is issued. Thereafter, the procedure returns to the step S11. A parameter of either the decoded I picture or the decoded P picture is stored in the re-order register 115a.

On the other hand, when the picture to be decoded in the step S12 is the B picture, the procedure proceeds to a step S14, and it is decided whether or not a bit 2 of the status register 116 is "1". When the bits 2 of the status register 116 is "1", that is, when data is stored in the current register 115b, the procedure returns from the step S14 to the step S11. Moreover, when the bit 2 of the status register 116 is "0" in the step S14, that is, when data is not stored in the current register 115b, the procedure proceeds to the step S15, so as to issue the decoding start command. Thereafter, the procedure returns to the step S11. A parameter of the B picture decoded is stored in the current register 115b.

Figure 18:
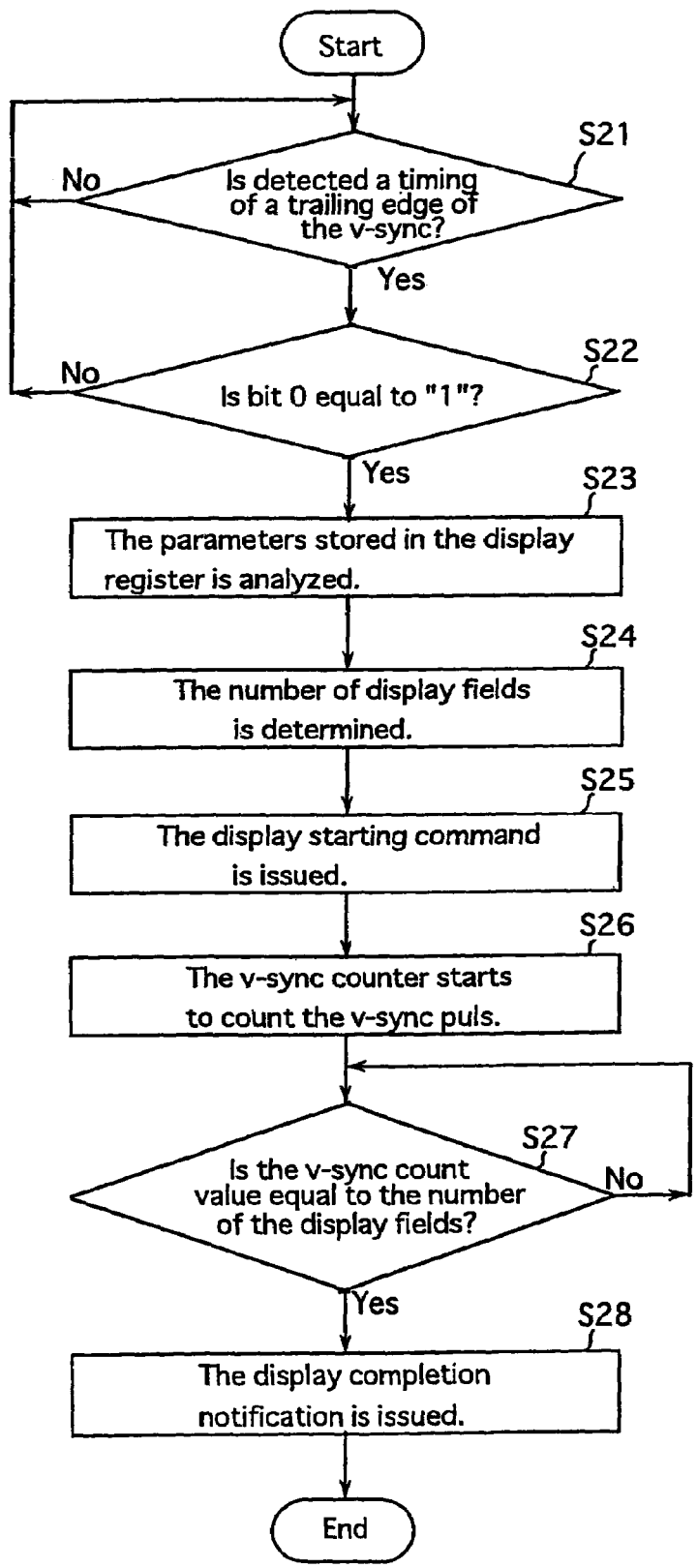
FIG. 18 is a flow chart showing an operation of the display control section of the second embodiment of the present invention.

FIG. 18 is a flow chart showing an operation of the display control section 115. In the step S21, a timing of a trailing edge of the V-Sync is detected. The procedure proceeds to the step S22 in response to the trailing edge of the V-Sync, and it is decided whether or not a bit 0 of the status register 116 is "1". When a LSB (Least Significant Bit: bit 0) of the status register 116 is "0", that is, when data is not stored in the display register 115d, the procedure returns to the step S21.

On the other hand, when the bit 0 of the status register 116 is "1", that is, when data is stored in the display register 115d, the procedure advance to the step S23, and the data stored in the display register 115d is analyzed. Then, the procedure proceeds to the step S24, and the number of display fields is determined in accordance with the repeat first field flag and the slow play back command flag. With the determination of the number of the display fields, the procedure proceeds to the step S25, and the display starting command 127 is issued.

Thereafter, the procedure proceeds to the step S26, and the V-Sync counter 115e starts to count the V-Sync pulses. In the step S27, the procedure does not proceed until the V-Sync count value becomes equal to the number of the display fields, and when the V-Sync count value becomes equal to the number of the display fields, the procedure proceeds to the step S28, so that the display completion notification 128 is issued.

FIG. 19 is a figure showing a method for counting the number of the display fields by the display control section 115. A table (a look-up table) showing a relation among the repeat first field flag, the ½ slow play back command flag and the number of the display fields is stored in the display control section 115, as shown in FIG. 19. The display field number calculation section 115f refers to the table and determines the number of the display fields from the states of the repeat first field flag and the ½ slow play back flag. For example, when any of the repeat first field flag and the ½ slow play back flag is "0", the number of the display fields is set to two. When any of the repeat first field flag and the ½ slow play back flag is "1", the number of the display fields is set to six.

Figure 20:
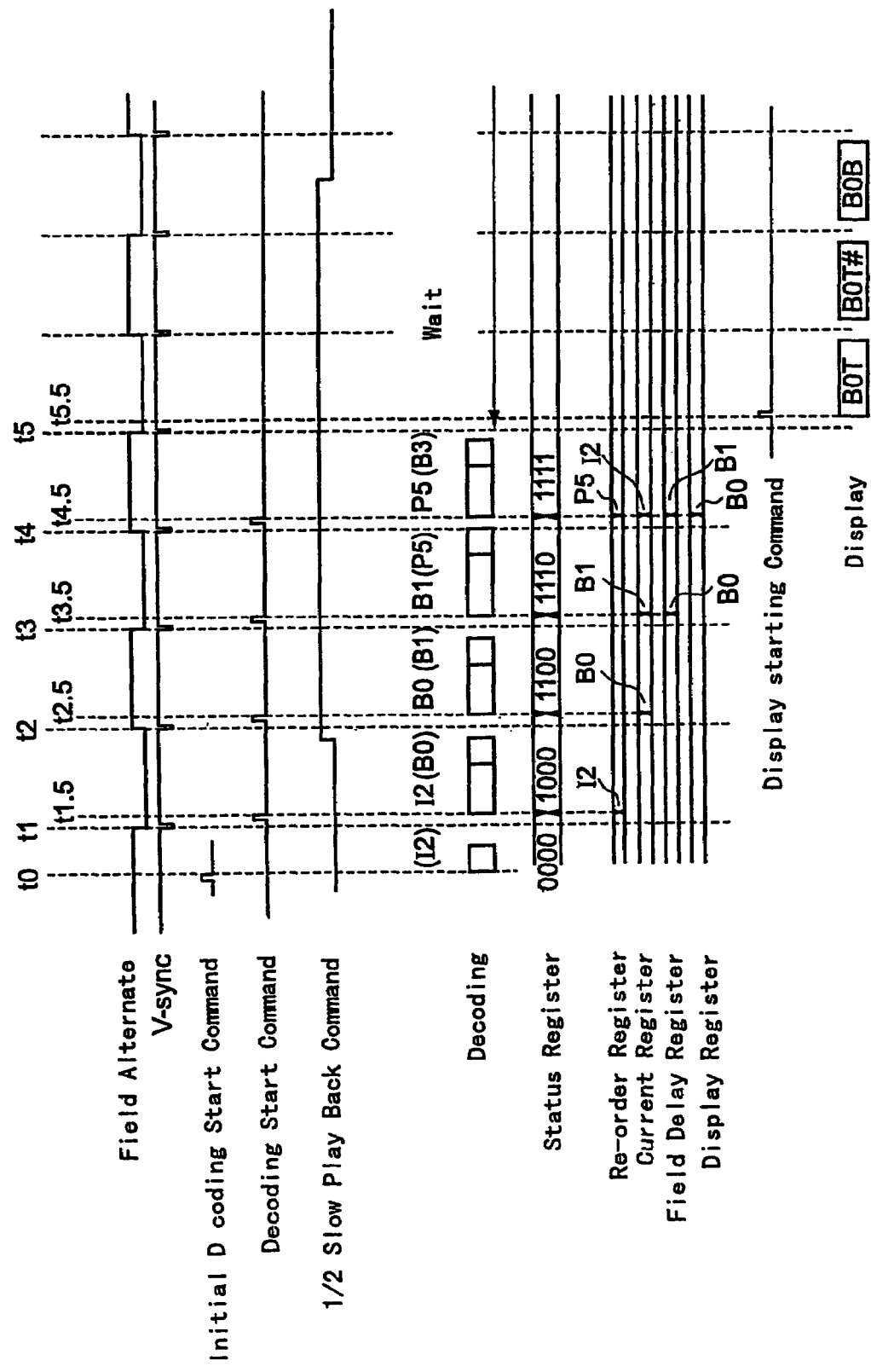
FIG. 20 is a timing chart (No.1) showing an operation of the MPEG video decoder of the second embodiment of the present invention.
Figure 21:
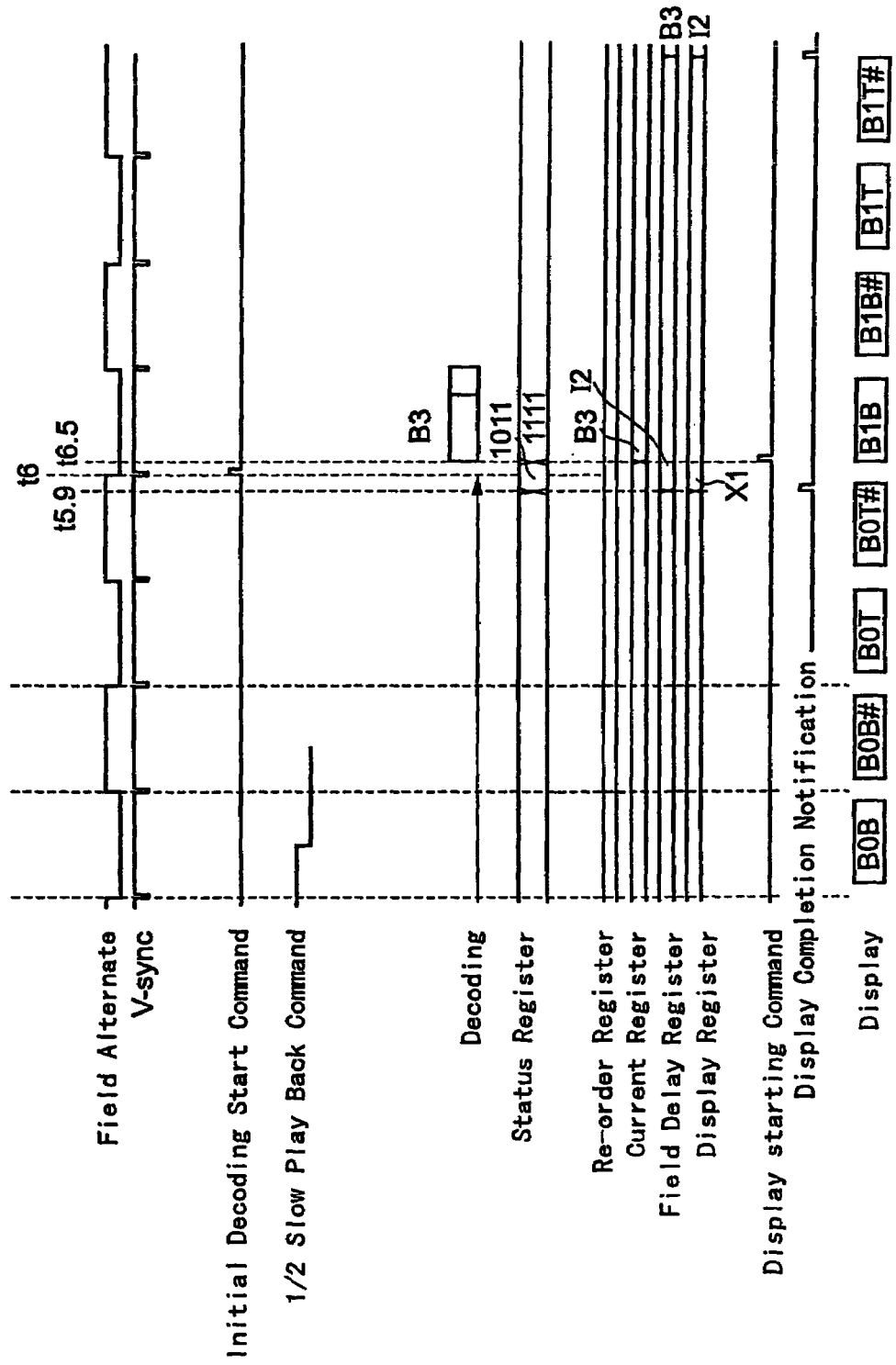
FIG. 21 is a timing chart (No.2) showing an operation of the MPEG video decoder of the second embodiment of the present invention.

FIGS. 20 and 21 are timing charts showing an operation of the MPEG video decoder of this embodiment. It should be noted that, in this embodiment, the bit-stream is inputted in the order of the I picture I2, the B picture B0, the B picture B1, the P picture P5, the B picture B3, and the B picture B4, . . . , and the bit-stream is displayed in the order of the picture B0, the picture B1, the picture I2, the picture B3, the picture B4, and the picture P5, . . . Moreover, it should be noted that the repeat first field command is added to the B pictures B0 and B4, and the I picture I2.

When the power source is supplied at the time t0, the decoding control section 114 issues the initial decoding start command 122. Upon the issue of the initial decoding start command 122, the picture decoding section 112 decodes the picture header (I2) of the picture I2.

Next, the decoding control section 114 examines the register data 124a outputted from the status register 116 at the time t1. At this time, since the value of the status register 116 is "0000", the decoding control section 114 issues the decoding start command 122, so that the picture decoding section 112 starts to decode a coefficient of the picture I2. As soon as the decoding of the coefficient of the picture I2 is completed, the picture decoding section 112 subsequently decodes the picture header (B0) of the picture B0.

The parameters and bank address of the picture I2 are stored in the re-order register 115a. Thus, the value of the status register 116 becomes "1000" (time t1.5).

Moreover, at the time t2, the decoding control section 114 examines the register data 124a outputted from the status register 116. At this time, since the value of the register data 124a is "1000", the decoding control section 114 issues the decoding start command 112 at a timing in synchronization with the V-Sync. Thus, the picture decoding section 112 starts to decode a coefficient of the picture B0. At this time, the display control section 115 samples the ½ slow play back command 128 using the trailing edge of the decoding start command 122 as a trigger. Since the ½ slow play back command 128 is "1", the ½ slow play back flag in the state of "1" is stored in the current register 115b. Furthermore, in this embodiment, since the repeat first field command is added to the picture B0, the repeat first field flag that is set to "1" is stored in the current register 115b.

Consequently, in this case, the values that are "1", indicated by the ½ slow play back command flag and repeat first field flag, are stored in the current register 115b.

Since the data of the picture B0 was stored in the current register 115b, the value of the bank status register 116 becomes "1100" (time t2.5).

Similarly, the decoding control section 114 examines the value of the bank status register 116 in response to the trailing edge of the V-Sync, and if there is a register having a value "0", the decoding control section 114 issues the decoding start command 122. Upon the issue of the decoding start command 122 by the decoding control section 114, the picture decoding section 112 starts to decode the coefficient. Upon completion of the coefficient decoding, the picture decoding section 112 decodes the picture header of a subsequent picture.

In the above described manner, the picture B1 and the picture B5 are decoded. The value of the bank status register 116 becomes "1111" at the time t5. Accordingly, the decoding control section 114 stops the issue of the decoding start command 122. Thus, the picture decoding section 112 suspends the decoding.

On the other hand, since the fact that the bank status register 116 is "1111" implies that a picture to be displayed is present in the display register 115b, the display control section 115 analyzes the parameter of the display register 115d. As a result of the analysis of the parameters, since both of the repeat first field flag and the ½ slow play back flag are "1", the display field number calculation section 115f set the number of the display fields to 6 (see FIG. 19). Then, the display control section 115 issues the display starting command 127 at the time t5.5. Thus, the picture B0 is transferred to the display unit, and displaying of the picture B0 is started. Thereafter, the display control section 115 displays the pictures for 6 fields, so that the display control section 115 counts the V-Sync five times, and when a time of a period of six fields has passed, the display control section 115 issues the display completion notification 128 to the status register 116. Then, the display control section 115 shifts the contents of the current register 115b and the field delay register 115c to the field delay register 115c and the display register 115d, respectively. Thus, a space is produced in the current register 115b, so that the value of the status register 116 becomes "1011" (time t5.9).

The decoding control section 114 examines the value of the status register 116 at the time t6. Since the value of the status register 116 is "1011", the decoding control section 114 issues the decoding start command. Thus, the picture decoding section 112 starts to decode a coefficient of the picture B3. A parameter of the picture B3 is stored in the current register 115b. As a result, the value of the status register 116 becomes "1111".

Moreover, the display control section 115 examines the parameter of the picture B1 which has been transferred to the display register 115d. Since the repeat first field flag is "0" and the ½ slow play back command flag is "1", the number of the display fields is set to four. Then, the display control section 115 issues the display starting command 127, and the display unit starts to display the picture B1 (time t6.5). Upon completion of the period for displaying the picture B1, the display control section 115 issues the display completion notification 128, and shifts the data of the current register 115b and the field delay register 115c to the field delay register 115c and the display register 115d, respectively.

In the above described manner, the MPEG video decoder of this embodiment correctly executes the 3-2 pull down and the ½ slow play back.

As described above, while the number of the display fields is determined by the decoding control section in the conventional MPEG video decoder, the display control section 115 determines the number of the display fields by using the table as shown in FIG. 19, in the MPEG video decoder of this embodiment. Therefore, the MPEG video decoder of this embodiment can cope with the 3-2 pull down play back, the ½ slow play back, and the 3-3 pull down play back and ½ slow play back.

The PTS (Presentation Time Stamp) is superposed on the pictures of the MPEG. The PTS is data indicating a time for displaying each of the pictures. The MPEG video decoder performs a time control of the play back using the PTS and a STC (System Time Clock) built therein.

Figure 22:
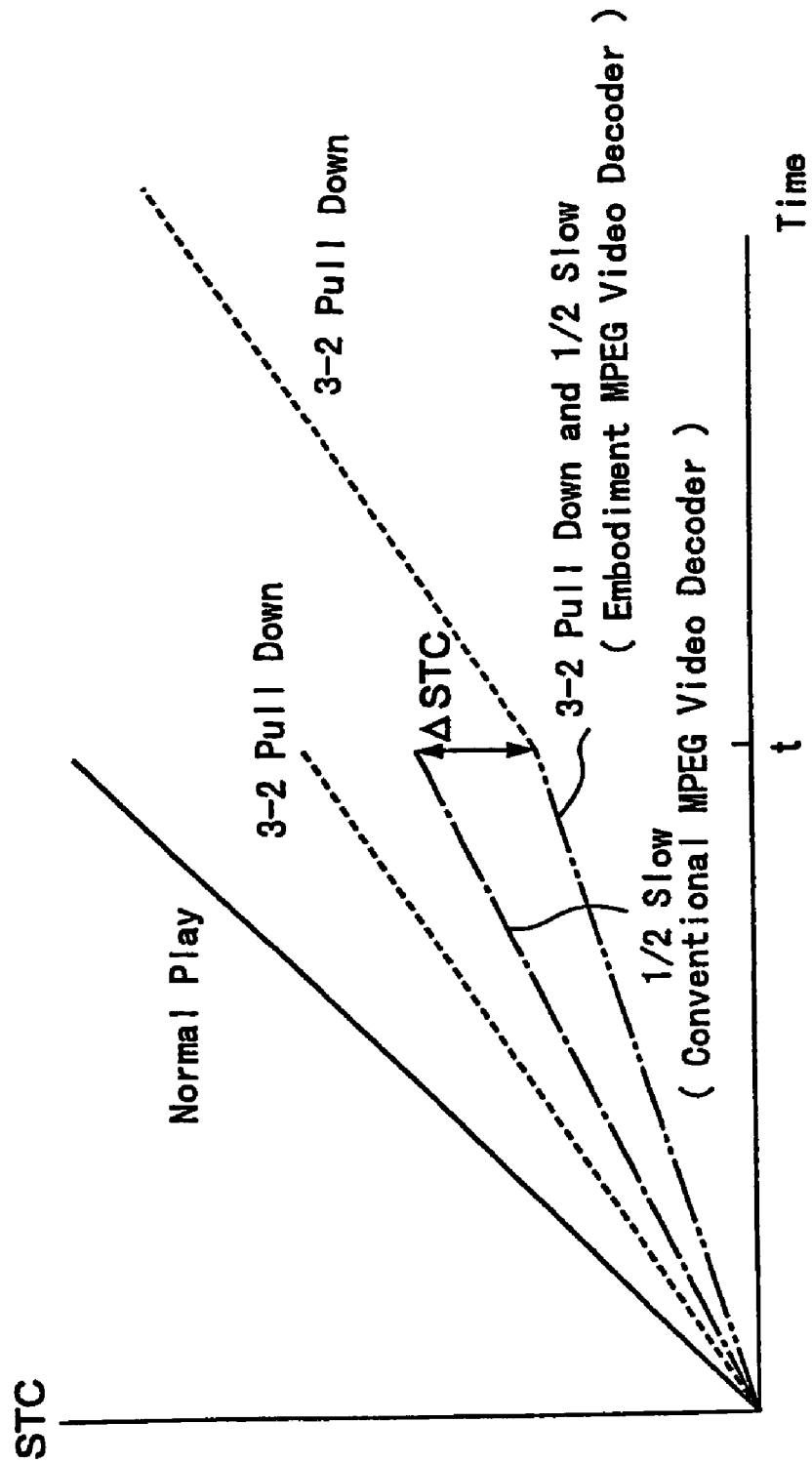
FIG. 22 is a figure showing a change with the passage of time of a STC at the time of an ordinary play back and a peculiar play back (3-2 pull down and ½ slow play back).

FIG. 22 is a figure showing a change with the passage of time of a STC at the time of an ordinary play back and a peculiar play back (3-2 pull down and ½ slow play back). In FIG. 22, the abscissa indicates a time and the ordinate indicates the STC. As shown in FIG. 22, the STC monotonously increases with the passage of time. Here, assuming that the slope of an increment of the STC at the time of the ordinary play back (normal play) be 1, the slope at the time of the 3-2 pull down play back must be ⅔, the slope at the time of the ½ slow play back must be ½, and the slope at the time 3-2 pull dawn and ½ slow play back must be ⅓.

However, since the 3-2 pull down and ½ slow play back is equivalent to the ½ slow play back in the conventional MPEG decoder, the increment of the STC becomes large by Δ STC than an originally calculated increment. Therefore, when the ½ slow play back is stopped at the time t and the play back mode is changed from 3-2 pull down and ½ slow play back to the 3-2 pull down, Δ STC must be subtracted from the STC or the STC must be corrected forcibly by using a new PTS in the conventional decoder. In this embodiment, when the play back mode is changed from the slow play back to the ordinary play back, it is unnecessary to correct the STC, and an excessive processing to correct the STC is unnecessary when a play back speed is changed to the ordinary play back speed.

In the description of the foregoing example, the case of the ½ slow play back was described. For example, a table showing a relation among the repeat first field flag, the slow play back command flag and the number of the display fields shown in FIG. 23 is used to determine the number of the display fields, whereby the 3-2 pull down play back, the ½ slow play back, the ⅓ slow play back and ¼ slow play back and ⅛ slow play back are enabled.

Moreover, although the decoding of the picture is performed in synchronization with the V-Sync in the above described embodiment, it is satisfactory that the decoding of the picture is performed without synchronizing the decoding of the picture with the V-Sync as in the first embodiment.

Although the preferred embodiments of the present invention have been described in detail, it should be understood that various changes, substitutions and alternations can be made therein without departing from spirit and scope of the inventions as defined by the appended claims.

What is claimed is:

1. A MPEG video decoder comprising:
   a picture decoding section for starting to decode a MPEG bit-stream in response to a decoding start command;
   a decoding frame buffer for storing picture data decoded by said picture decoding section;
   a display control section for analyzing parameters of the picture data for each picture, said picture data being decoded by said picture decoding section, and controlling a transfer of said picture data from said decoding frame buffer to a display unit in accordance with an analysis result of said parameters; and
   a decoding control section for outputting said decoding start command based on the parameters of said picture data;
   wherein said display control section determines the number of display fields of each of said pictures based on said parameters for each picture, and allowing said pictures to be displayed on said display unit for a predetermined period of time equivalent to said number of display fields; and said display control section includes four shift registers of a re-order register for storing a parameter of either an I picture or a P picture and a bank address thereof, a current register for storing a parameter of a picture and a bank address thereof, the picture being subsequently displayed, a field delay register for delaying the parameter and the bank address shifted from said current register by one field time, and a display register for storing a parameter of a picture and a bank address thereof, which is being displayed.

2. The MPEG video decoder according to claim 1, wherein the parameters of said picture data include a peculiar play back flag.

3. The MPEG video decoder according to claim 2, wherein said peculiar play back flag is a repeat first field flag or a slow play back command flag.

4. The MPEG video decoder according to claim 1, wherein said display control section stores a table showing a relation between the parameters of said picture data and said number of display fields.

5. The MPEG video decoder according to claim 1, wherein said re-order register and said current register use said decoding start command as a shift pulse, and said field delay register and said display register use a vertical synchronous signal as a shift pulse.

6. The MPEG video decoder according to claim 1, said MEG video decoder further comprising:

a status register for indicating states of said re-order register, said current register, said field delay register and said display register.

7. The MPEG video decoder according to claim 6, wherein said decoding control section refers to a state of said status register, and issues said decoding start command when data is not existed in either said re-order register or said current register.

8. The MPEG video decoder according to claim 7, wherein said decoding control section refers to said status register at a timing in synchronization with a vertical synchronous signal.

9. The MPEG video decoder according to claim 6, wherein said display control section refers to a state of said status register, and determines said number of display fields from the parameter when the parameter and the bank address are stored in said display register.

10. The MPEG video decoder according to claim 9, wherein said display control-section refers to said status register at a timing in synchronization with a vertical synchronous signal.

11. A MPEG video decoding method comprising the steps of:

starting to decode a MPEG bit-stream in response to a decoding start command outputted from a decoding control section;

storing decoded picture data in a decoding frame buffer;

storing parameters of said decoded picture data in a display control section;

determining the number of display fields for each picture from said parameters by said display control section; and displaying each of said pictures on a display unit for a period of time equivalent to the number of display fields, wherein said parameters of said picture data include a plurality of peculiar play back flags, said display control section determines the number of display fields by using a table showing a relation between each state of said plurality of peculiar play back flags and the number of the display fields.

\* \* \* \* \*

UNITED STATES PATENT AND TRADEMARK OFFICE
CERTIFICATE OF CORRECTION

PATENT NO. : 7,555,045 B2
APPLICATION NO. : 10/614054
DATED : June 30, 2009
INVENTOR(S) : Tadayoshi Kono et al.

It is certified that error appears in the above-identified patent and that said Letters Patent is hereby corrected as shown below:

Column 23, Line 30, change "MEG" to --MPEG--.

Column 24, Line 13, change "control-section" to --control section--.

Signed and Sealed this

Third Day of November, 2009

David J. Kappos
*Director of the United States Patent and Trademark Office*